United States Patent
Tanikawa et al.

(10) Patent No.: US 8,077,577 B2
(45) Date of Patent: Dec. 13, 2011

(54) INFORMATION RECORDING DEVICE AND METHOD, AND COMPUTER PROGRAM

(75) Inventors: Toshiro Tanikawa, Saitama (JP); Masayoshi Yoshida, Saitama (JP); Kazuo Kuroda, Saitama (JP)

(73) Assignee: Pioneer Corporation, Tokyo (JP)

( * ) Notice: Subject to any disclaimer, the term of this patent is extended or adjusted under 35 U.S.C. 154(b) by 621 days.

(21) Appl. No.: 11/664,504

(22) PCT Filed: Oct. 3, 2005

(86) PCT No.: PCT/JP2005/018296
§ 371 (c)(1),
(2), (4) Date: May 31, 2007

(87) PCT Pub. No.: WO2006/038590
PCT Pub. Date: Apr. 13, 2006

(65) Prior Publication Data
US 2008/0062844 A1 Mar. 13, 2008

(30) Foreign Application Priority Data
Oct. 4, 2004 (JP) .................................. 2004-291719

(51) Int. Cl.
*G11B 7/0045* (2006.01)
(52) U.S. Cl. .............. 369/59.25; 369/124.07; 369/275.3
(58) Field of Classification Search .................. None
See application file for complete search history.

(56) References Cited

U.S. PATENT DOCUMENTS

| 5,729,525 A | 3/1998 | Ishida et al. |
| 7,177,256 B2 * | 2/2007 | Motohashi ................. 369/59.25 |
| 2003/0081535 A1 * | 5/2003 | Ross ........................... 369/275.3 |
| 2004/0156294 A1 * | 8/2004 | Watanabe et al. ............... 369/94 |
| 2005/0030874 A1 * | 2/2005 | Sasaki ............................. 369/94 |
| 2005/0041546 A1 * | 2/2005 | Suzuki ...................... 369/47.27 |

FOREIGN PATENT DOCUMENTS

| EP | 0890948 | 7/1998 |
| EP | 0 890 948 | 1/1999 |
| EP | 1176586 | 3/2001 |

(Continued)

OTHER PUBLICATIONS

European Patent Office issued an European Office Action dated Dec. 29, 2009, Application No. 05788060.1.

*Primary Examiner* — Will J Klimowicz
*Assistant Examiner* — Emily Frank
(74) *Attorney, Agent, or Firm* — Young & Thompson

(57) ABSTRACT

An information recording device can record a plurality of pieces of recording information, for instance, at different times, in an information recording medium provided by stacking first and second recording layers. A writing control element controls a writing element so that each piece of the information can be written over the first recording layer to the second recording layer. Furthermore, a boundary control member controls the writing element so that first boundary information is written in a recording area which is to be a boundary between the pieces of information in the first recording layer, and that second boundary information is written or ensured, in a recording area of a second recording layer which overlaps the recording area wherein the first boundary information of the first recording layer is written, as a recording area to be a boundary between the pieces of information in the second recording layer.

9 Claims, 11 Drawing Sheets

FOREIGN PATENT DOCUMENTS

| | | |
|---|---|---|
| EP | 1477983 | 11/2004 |
| EP | 1722365 | 1/2005 |
| EP | 1722367 | 2/2005 |
| EP | 1811382 | 9/2005 |
| JP | 09-016966 | 1/1997 |
| JP | 2000-503446 | 3/2000 |
| JP | 2000-311346 | 11/2000 |
| JP | 2001-023237 | 1/2001 |
| JP | 2002-133667 | 5/2002 |
| JP | 2003-059059 | 2/2003 |
| WO | 2004-086394 | 10/2004 |
| WO | 2005/020231 | 2/2005 |

* cited by examiner

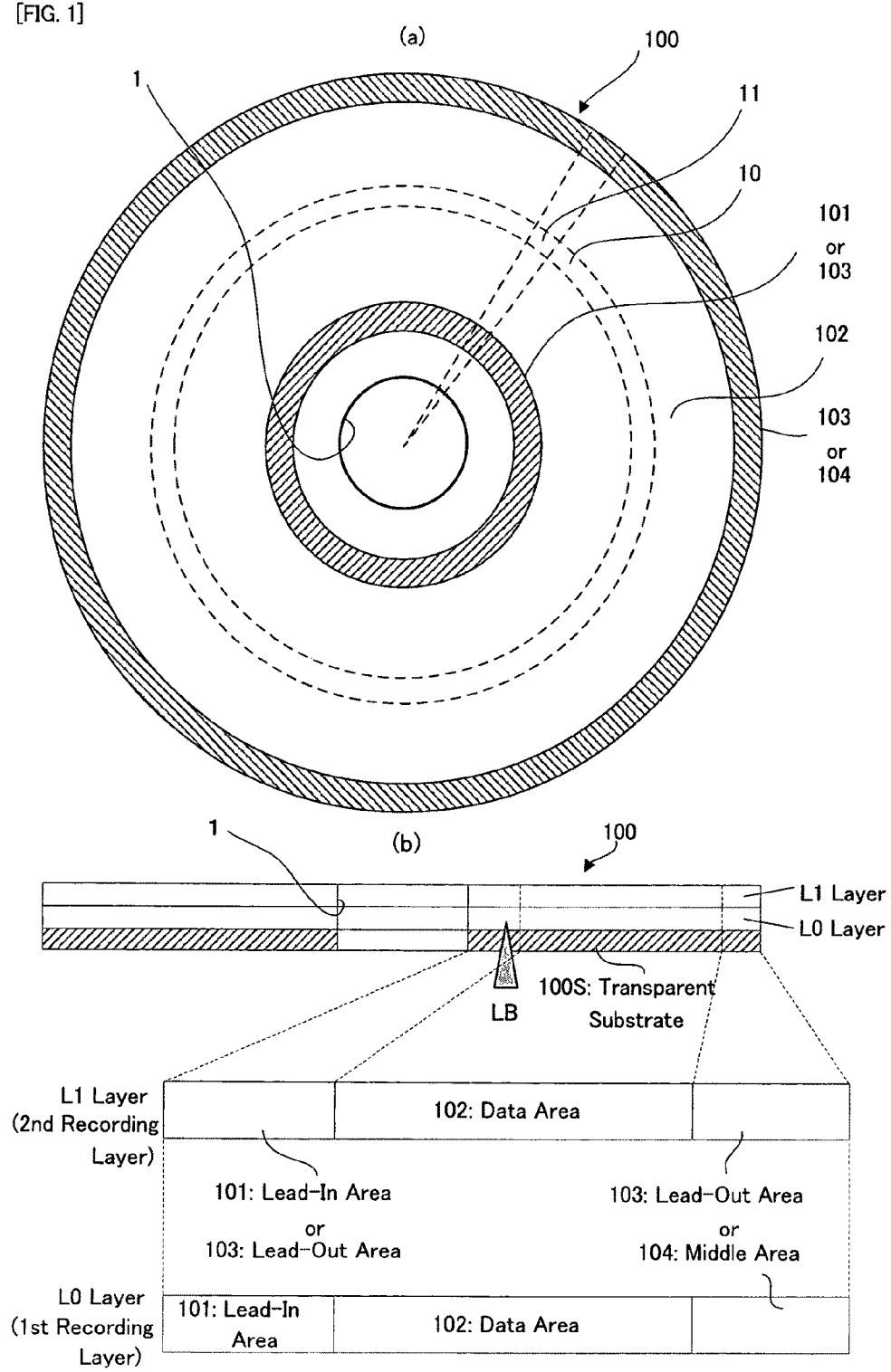

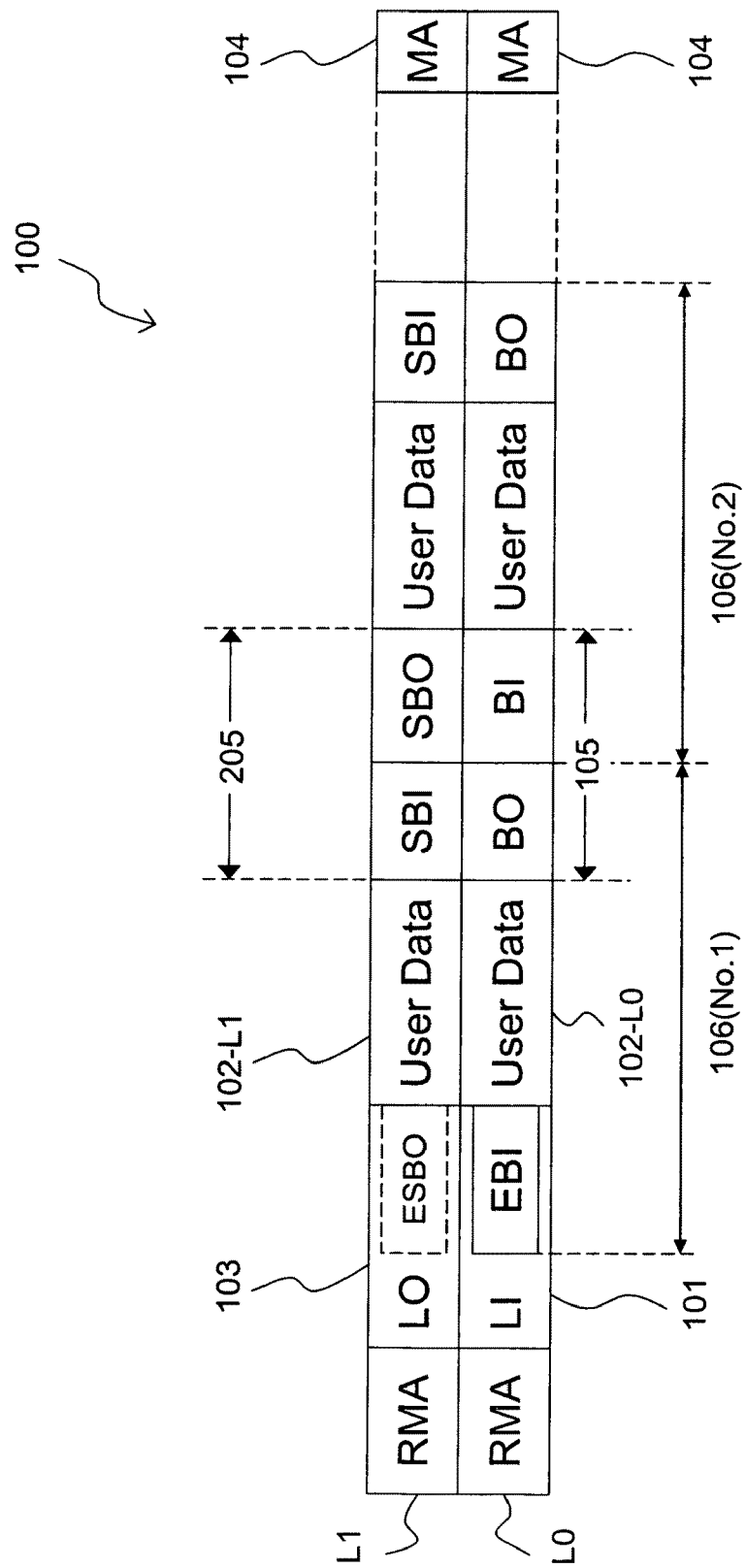
[FIG. 2]

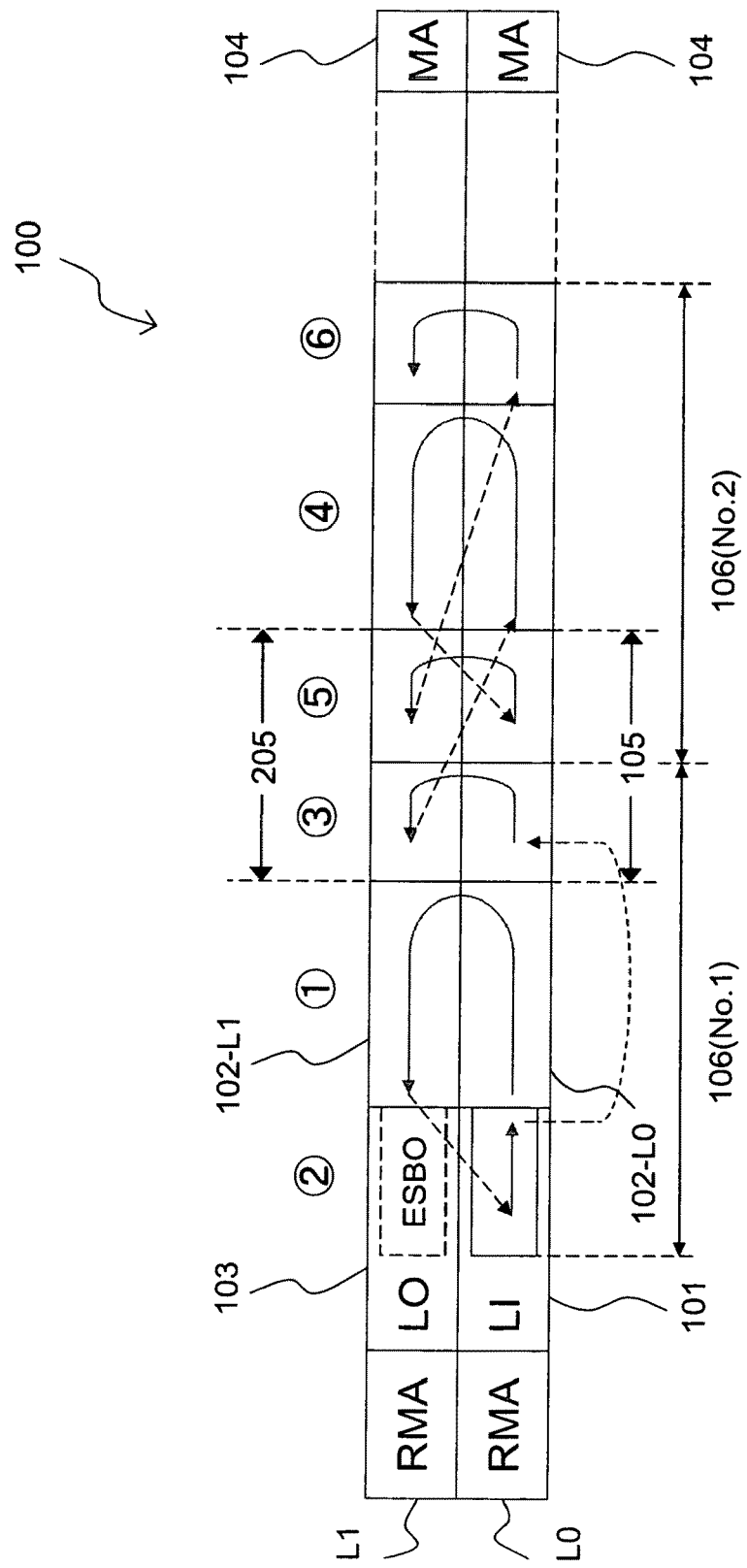
[FIG. 3]

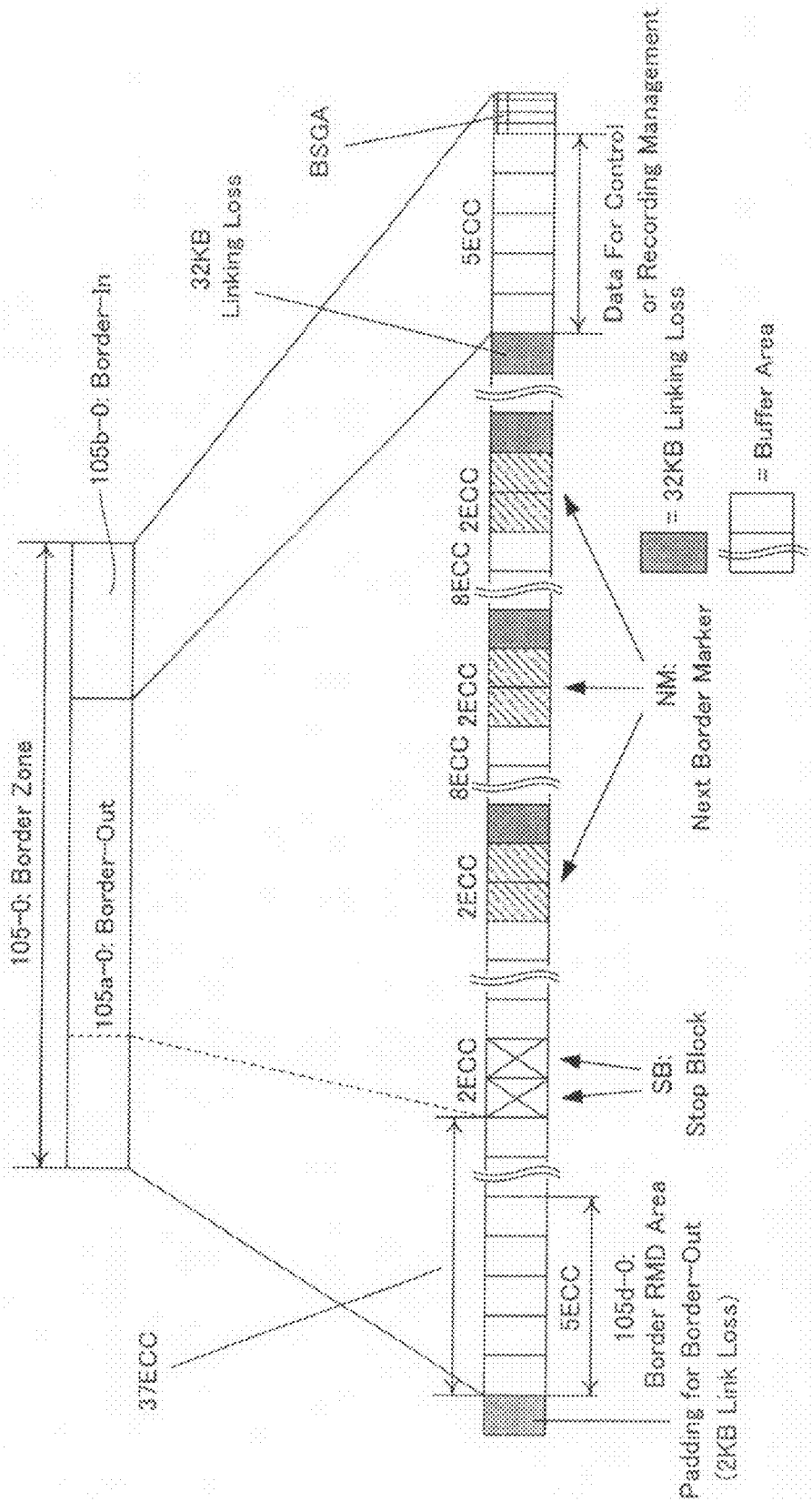

[FIG. 5]
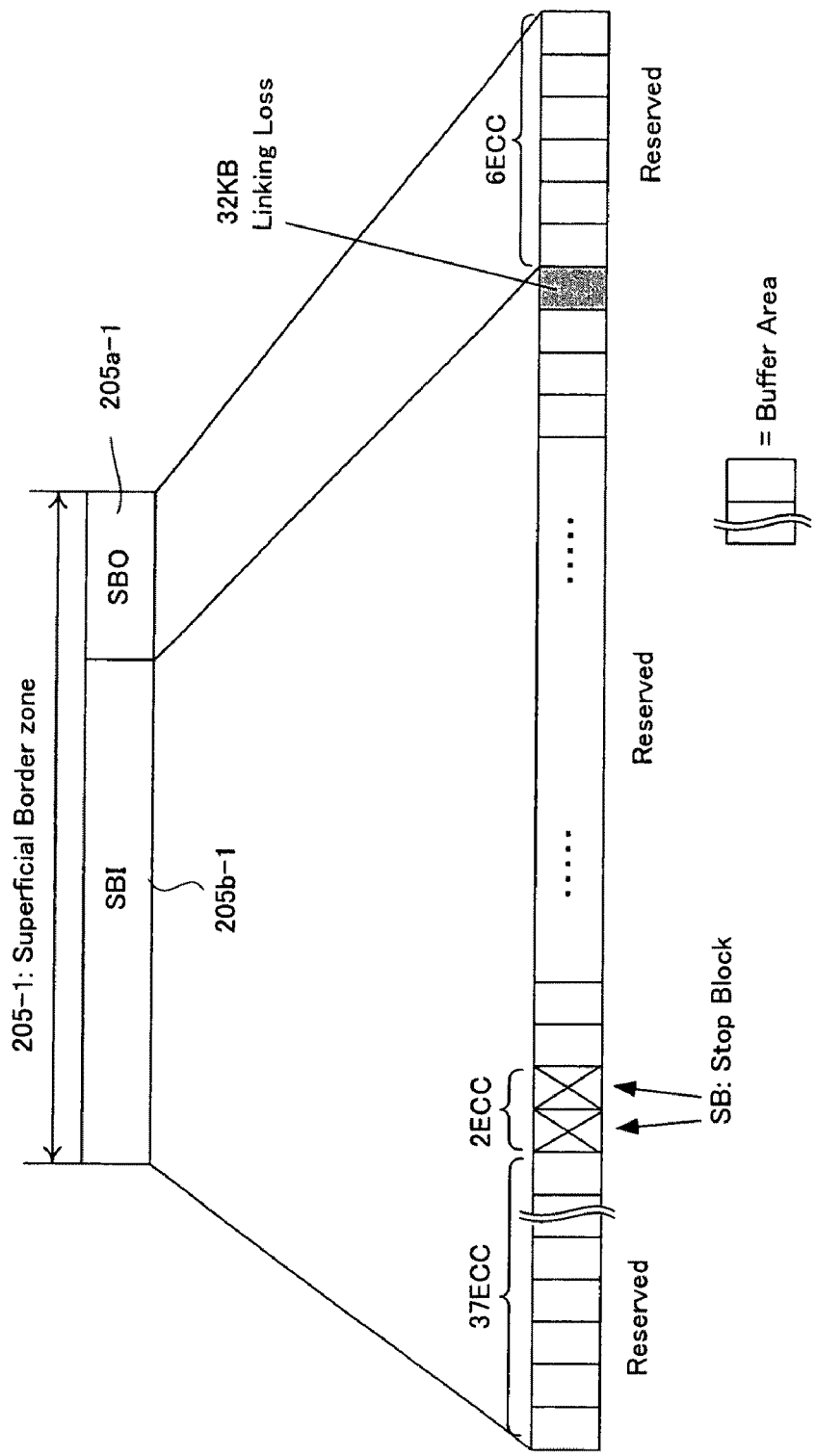

[FIG. 6]
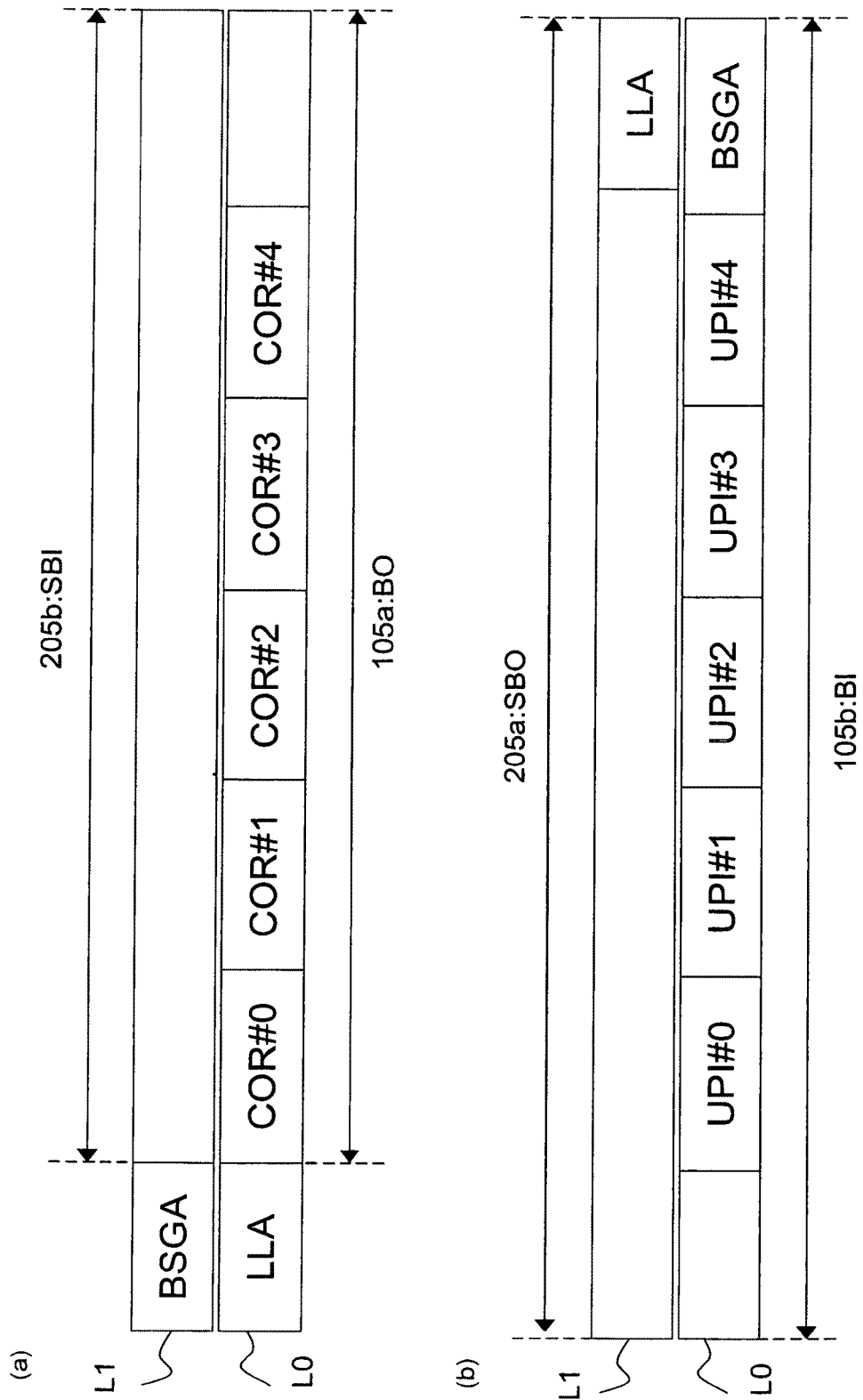

[FIG. 7]
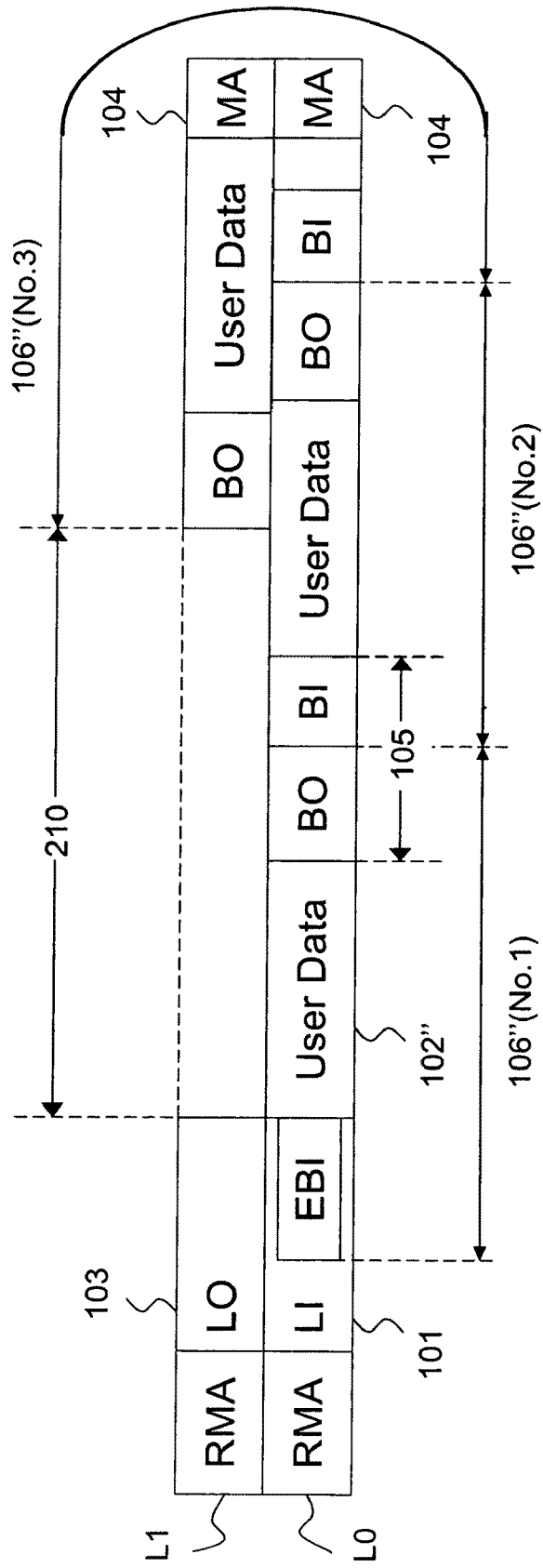

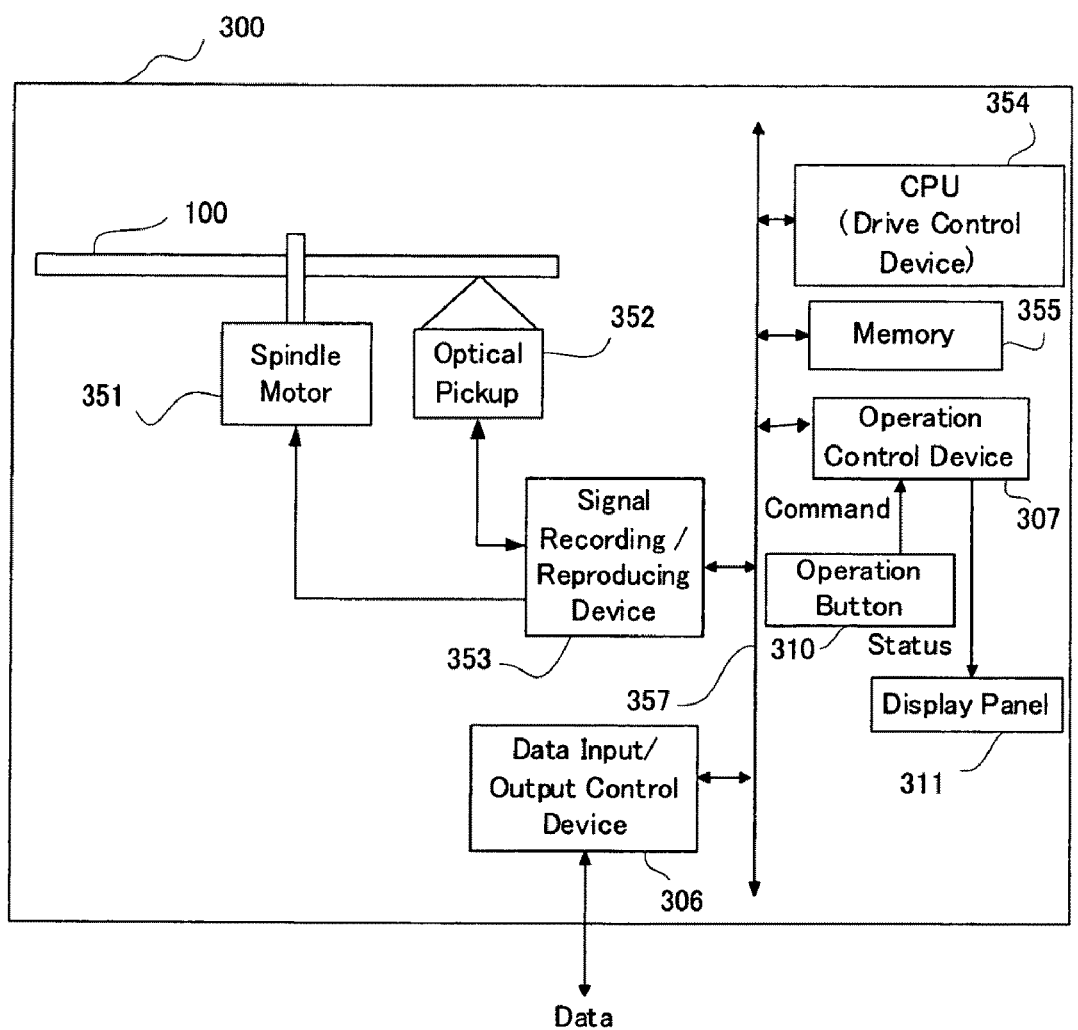
[FIG. 8]

[FIG. 9]
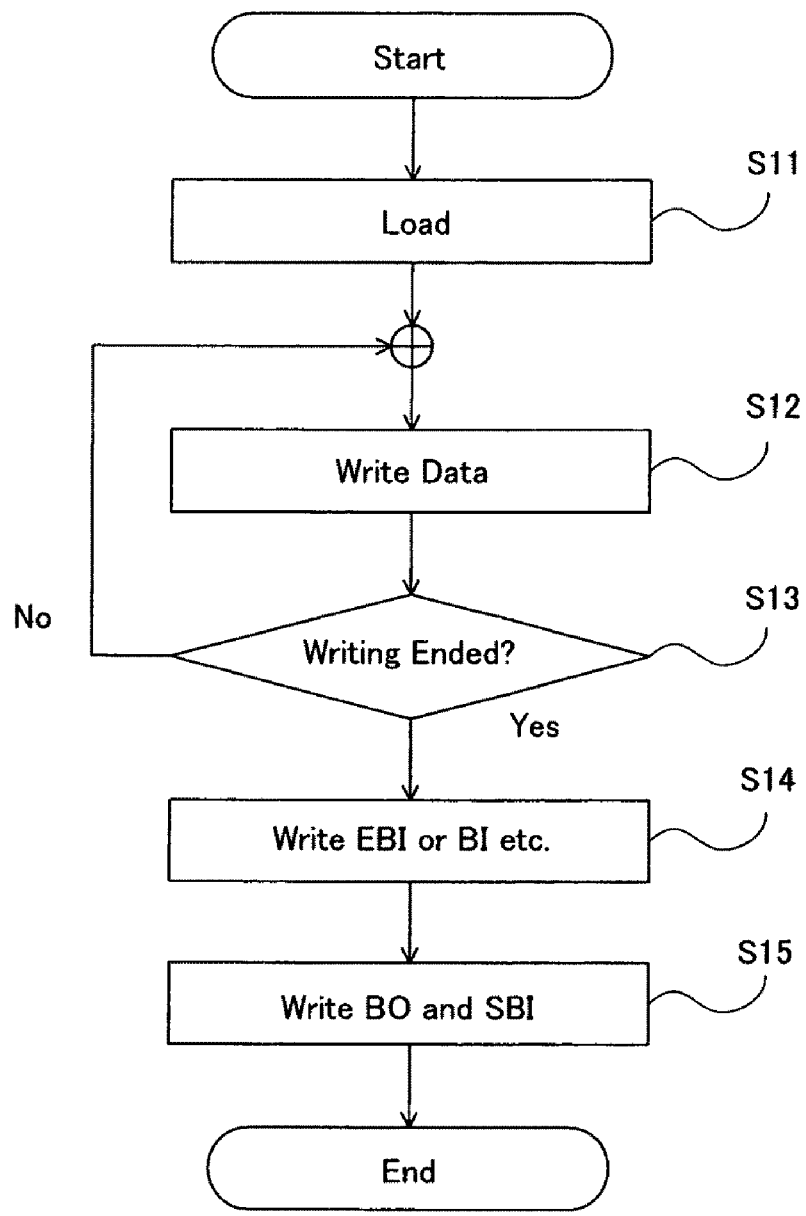

[FIG. 10]
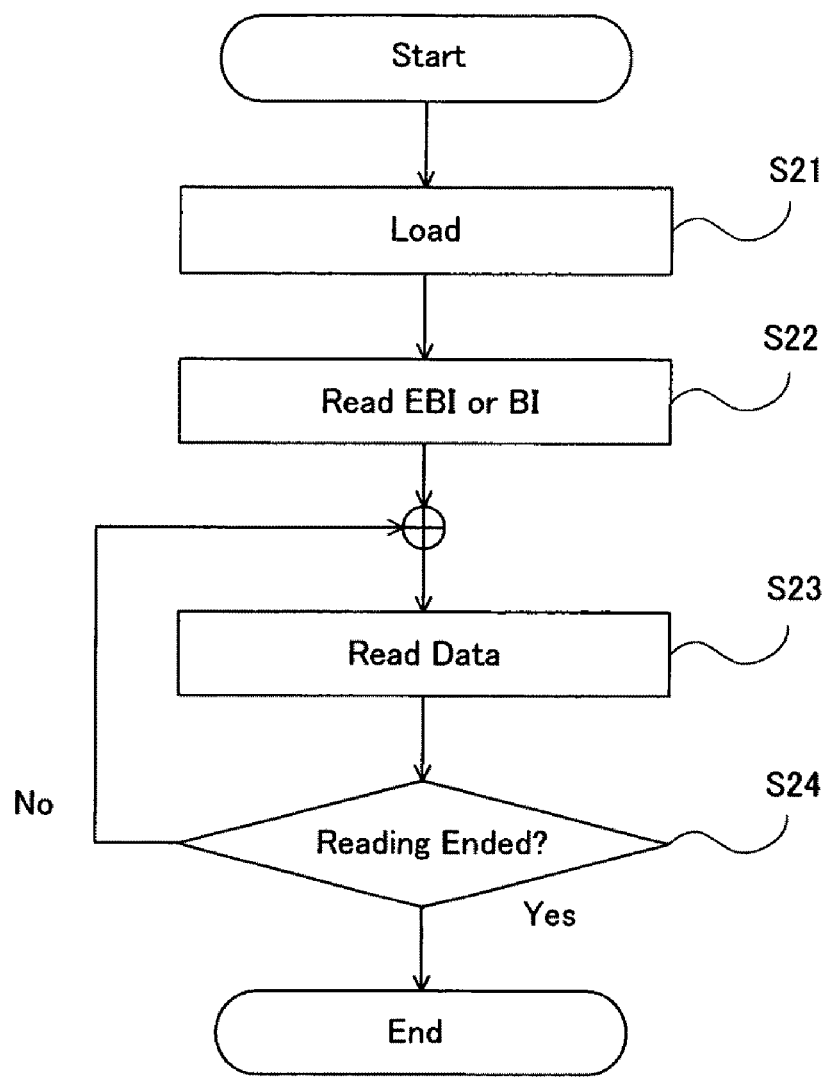

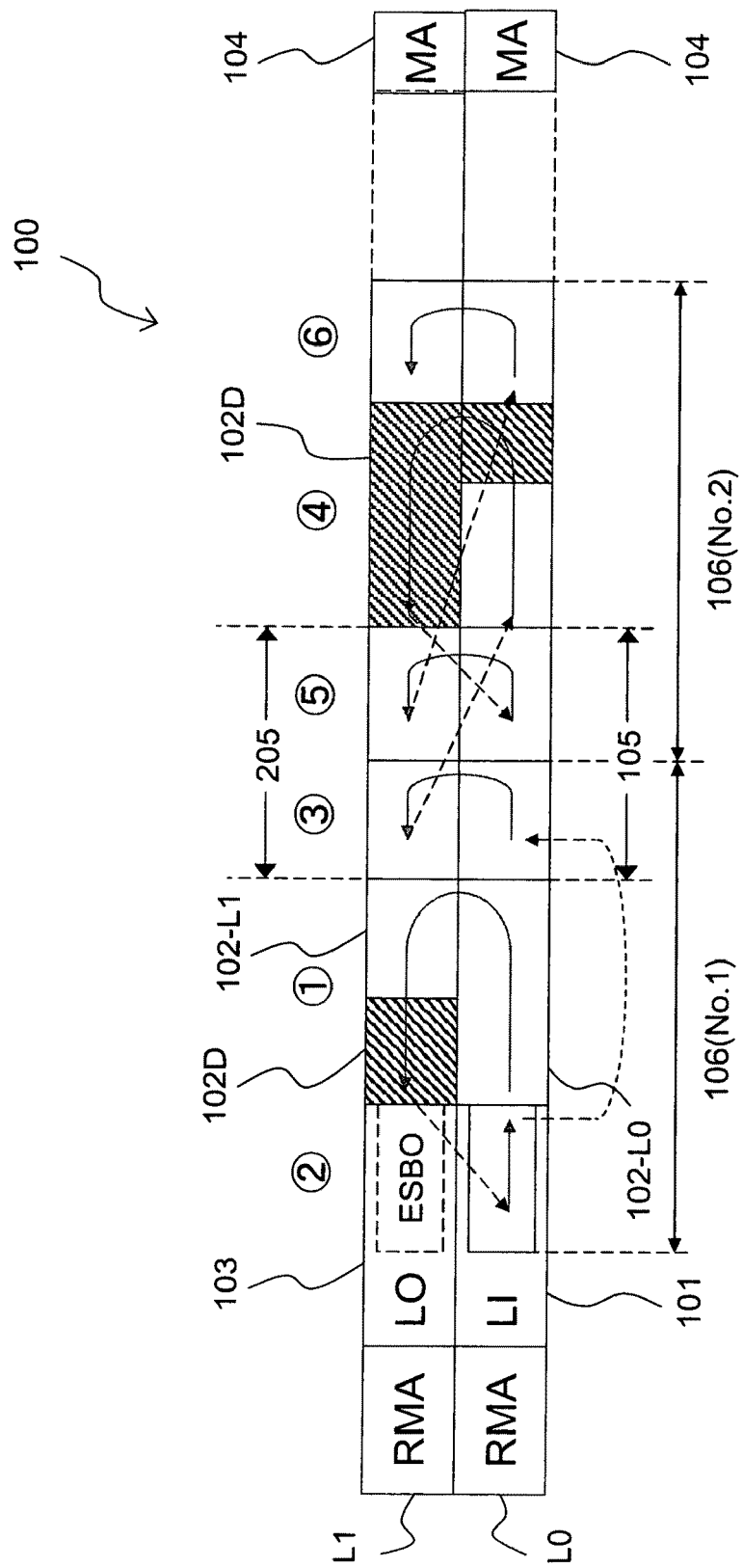
[FIG. 11]

INFORMATION RECORDING DEVICE AND METHOD, AND COMPUTER PROGRAM

TECHNICAL FIELD

The present invention relates to an information recording apparatus and method, such as a DVD recorder, and a computer program.

BACKGROUND ART

For example, in a single layer type optical disc, such as a DVD-R/RW, a border zone is recorded after information which is already recorded in a user data area. By this, compatibility is maintained between an information reproducing apparatus or reproduce-only equipment (hereinafter merely referred to as a "player etc."), such as a player and a ROM drive, and an information recording apparatus or information recording/reproducing apparatus (hereinafter merely referred to as a "recorder etc."), such as a recorder and a RAM drive. The "border zone" herein is an area for buffering i.e., a buffer area to prevent an unrecorded area from adjacently lying immediately after the information already recorded in the user data area or immediately after an area in which the information is recorded, as in a lead-out area in a DVD-ROM or the like. More specifically, the border zone has a structure prepared in order to perform an additional or postscript recording method, such as a multi session in a CD-R, even on a DVD-R. Incidentally, a process of recording the border zone is generally referred to as a "border close (process)". By recording the border zone so as not to allow, on the DVD-R or the like, the unrecorded area to adjacently lie the information already recorded in the user data area, it is possible to perform normal control of tracking servo, with respect to a DVD-R drive in which a push-pull method is adopted as a tracking method, by using an optical pickup of a DVD-ROM reproduce-only drive in which a phase difference method is adopted. As described above, the presence of the border zone prevents such a situation that the optical pickup of the player etc. jumps out of the already recorded user data area into the unrecorded area which is spread on the outer circumferential side thereof.

On the other hand, in an information recording medium, such as a CD and a DVD, there is developed a multiple layer or multilayer type, or two-layer type (i.e. dual layer type) optical disc, in which a plurality of recording layers are laminated or pasted on the same substrate, as descried in patent documents 1, 2, and the like. On the recorder etc. for recording information onto such a multilayer type optical disc, laser light for recording is focused onto a recording layer located on the front or the closest side (referred to as an "L0 layer", as occasion demands, in the application), as viewed from a laser light irradiation or emission side, to thereby record the information into the L0 layer in a rewritable method or irreversible change recording method by heat or the like. Then, the laser light is focused onto a recording layer located on the rear or farther side (referred to as an "L1 layer", as occasion demands, in the application), as viewed from the laser light irradiation side, through the L0 layer and the like, to thereby record the information into the L1 layer in a rewritable method or irreversible change recording method by heat or the like.

In particular, there is also disclosed a technology of performing the recording or reproduction in an "opposite manner" with respect to the L0 layer and the L1 layer. The "opposite manner" herein is a recording or reproducing manner in which the directions of the track passes are opposite between the two recording layers. On the two-layer type optical disc in the opposite manner, as disclosed in a patent document 3, it is necessary to record a middle area as a buffer area on the disc outer circumferential portions of the L0 layer and the L1 layer. The "middle area" plays the same role as the lead-out of the single layer type optical disc, and the above-mentioned border zone. The "middle area" is a buffer area to prevent an unrecorded area from adjacently lying immediately after the user data area in which the information is recorded.

Patent document 1: Japanese Patent Application Laid Open NO. 2000-311346
Patent document 2: Japanese Patent Application Laid Open NO. 2001-23237
Patent document 3: Japanese Patent Application Laid Open NO. 2000-503446
Patent document 4: Japanese Patent Application Laid Open NO. 2002-133667
Patent document 5: Japanese Patent Application Laid Open NO. 2003-59059
Patent document 6: Japanese Patent Application Laid Open NO. Hei 9-16966
Patent document 7: Japanese Patent Application Laid Open NO. 2001-23237

DISCLOSURE OF INVENTION

Subject to be Solved by the Invention

However, considering the case where the structure of the border zone adopted in the single layer type optical disc is applied to the multilayer type optical disc in the opposite manner, the following problem occurs.

That is, firstly, a plurality of information written into the user data area in response to a series of writing operations is individually written at different opportunities in the nature of an additional recording process, in most cases. However, as long as the unrecorded area is left in the L1 layer, it is hardly possible to read the information recorded in the already recorded user data area in the L0 layer which is spread in the same radial position as that of the unrecorded area, by using the player etc. In other words, in this case, there is no compatibility between the recorder etc. and the player etc. Although the reason to provide the border zone is originally to make it reproducible even by the player etc., the situation is that it cannot be reproduced by the player etc. as long as the unrecorded area is left in the L1 layer.

On the contrary, if dummy data or the like is written into the unrecorded area of the L1 layer which follows the last border zone and a so-called "finalize process" or a similar process is performed, the player etc. can read the information from the already recorded area of the L0 layer which is spread in the same radial position as that of the unrecorded area. However, once the finalize process is performed as described above, it is no longer possible to write the information into the user data area which follows the last border zone. In other words, such greatest advantages in the additional recording process are lost that the information can be additionally recorded or written once at different opportunities and that because of this, the user data area is not wasted. Moreover, even if the waste of the user data area is allowed, it takes a long time for the finalize process.

As described above, even if the prior arts are somehow combined, in the case where the recording is performed in the opposite manner on the multilayer type optical disc, there is such a technical problem that the additional recording process is impossible in order to realize the compatibility with the player etc., and on the contrary, in order to realize the additional recording process, the compatibility cannot be ensured with the player etc.

It is therefore an object of the present invention to provide an information recording apparatus and method, such as the recorder etc., which can perform recording without wasting a recording area while ensuring the compatibility with the player etc., in each recording layer on the multilayer type optical disc, for example, as well as a computer program.

Means for Solving the Subject (Information Recording Apparatus)

The information recording apparatus of the present invention will be discussed hereinafter.

The above object of the present invention can be achieved by an information recording apparatus capable of recording a plurality of record information onto an information recording medium on which at least a first recording layer and a second recording layer are laminated, the information recording apparatus provided with: a writing device capable of writing each of the plurality of record information; a writing controlling device for controlling the writing device to write each of the plurality of record information such that each of the plurality of record information bridges over the first recording layer to the second recording layer; and a border controlling device for controlling the writing device to write first border information (e.g. BI and BO described later) into a recording area which is a border between the plurality of record information in the first recording layer, and to write or ensure second border information (e.g. SBO and SBI described later) in a recording area of the second recording layer, which is overlapped with the recording area of the first recording layer in which the first border information is written, as a recording area which is to be a border between the plurality of record information in the second recording layer.

According to the information recording apparatus of the present invention, the information recording medium is a two-layer type or multilayer type optical disc onto which information can be additionally recorded or written once and on which the first recording layer, e.g. an L0 layer, and the second recording layer, e.g. an L1 layer, are laminated. The information recording apparatus is a DVD recorder or the like, for example, which can perform the recording in a form of the additional recording or the like with respect to such an information recording medium. Typically, the information recording apparatus can record the plurality of record information, each of which is recorded in response to a series of recording operations, at different opportunities or at the same opportunity. For example, one group of contents and a file are individually recorded as the record information at different opportunities after the ON/OFF of a main power supply while one information recording medium is loaded on one information recording apparatus, or at different opportunities after the loading, unloading, and further loading of one information recording medium among a plurality of information recording apparatus. As in the above example, it is possible to perform the recording onto one information recording medium at different opportunities. Moreover, it is possible to perform the recording at the same opportunity, such as continuously recording a plurality of contents and a plurality of files at the same opportunity while the main power remains ON after one information recording medium is loaded onto one information recording apparatus.

Upon the recording, under the control of the writing controlling device constructed from a controller, a CPU, and the like, one record information is written by the writing device, such as an optical pickup, so that the one record information bridges over the first recording layer to the second recording layer. For example, the former half portion of one record information is written into an L0 layer which is one example of the first recording layer, then, a layer jump is performed, and then, the latter half portion of the one record information is written into an L1 layer which is one example of the second recording layer. The record information is written into a user data area, for example.

Before or after writing of the record information, under the control of the border controlling device constructed from a controller, a CPU, and the like, which is the same as or different from the writing controlling device, the first border information, e.g. the BI (Border-In) and the BO (Border-Out) or the like described later, is written by the writing device into the recording area which is to be a border between the plurality of record information in the first recording layer. It is better to perform the writing of the first border information after the above-mentioned writing of the record information which surely makes the border clear; however, if the border position can be predicted by the reverse calculation from the information amount of the record information to be recorded, the first border information can be written before the writing of the record information described above.

Moreover, before or after writing of the first border information, under the control of the border controlling device, the second border information, e.g. the SBO (Superficial Border-Out) and the SBI (Superficial Border-In) or the like described later, is written by the writing device in the recording area of the second recording layer, which (i.e., the recording area of the second recording layer) is overlapped with the recording area of the first recording layer in which the first border information is written, as a recording area which is to be a border between the plurality of record information in the second recording layer. The phrase "be overlapped with the recording area" herein means that areas are in the same radial position or in the same radial area of a disc-shaped optical disc and that one lies on the other, as viewed two-dimensionally in the lamination direction of the first and second recording layers of the information recording medium. Complete overlap is preferable; however, at least partial overlap can give a proper effect explained later. Moreover, the term "be overlapped" or the "same radial position or same radial area" herein has a concept in which it is enough if it can be identified with the term "be overlapped" or the "same radial position or same radial area", from the specification and the performance of the apparatus, in performing a recording operation by the information recording apparatus, or in performing a reproduction operation on the recorder etc. and the player etc. It includes not only a complete case of the term "be overlapped" or the "same radial position or same radial area", but also a practical case thereof. It is better to perform the writing of the second border information after the writing of the first border information; however, it is also possible to perform it before the writing of the first border information. Moreover, "to ensure the second border information" has a concept in which it is enough if the second border information conceptually exists as different information from the record information in the second recording layer or if a certain recording area is assigned or allocated, not to the record information, but to the second border information, because it is possible to treat the initial or previous recoding state of the information recording medium, as the recording state of the second border information even if the writing device does not specially perform a writing operation of writing the second border information. In other words, it is enough if a recording area in the predetermined recording state is reserved as the second border information.

As described above, the first border information recorded in the first recording layer and the second border information recorded in the second recording layer are recorded, as a pair of border information, in their respective areas which are overlapped with each other. Therefore, in the case where the additional writing processes are performed at different opportunities, it is possible to avoid the situation that the record information cannot be reproduced by the player etc., by making the record-information-recorded area in one of the first and second recording layers and making the unrecorded area in the other recording layer which is overlapped therewith, during the additional writing processes. In particular, it is possible to effectively avoid the situation that the function of a border or boundary which is a "border zone", or the function of the border information deteriorates or disappears, by making the record-information-recorded area in at least one of the first and second recording layers and making the unrecorded area in the other recording layer which is overlapped therewith.

Thus, even during the additional writing processes performed at different opportunities, it is possible to surely read one record information which is already recorded in the recording area, e.g. a user data area, between the borders, so that the compatibility can be ensured between the recorder etc. and the player etc. Moreover, a so-called "finalize process" in which dummy data or the like is written into the unrecorded area or a similar process is no longer required in order to realize the compatibility between the recorder etc. and the player etc. Thus, the situation that the record information cannot be subsequently recorded does not occur, as in the case where the finalize process or the like is performed once. In other words, it is greatly useful since the record information can be additionally recorded or written once at a different opportunity after a reproduction opportunity by the player etc., so that in this case, it is possible to avoid a waste of the recording area, such as the user data area. In addition, it does not require a long processing time as in the finalize process.

Consequently, according to the present invention, the recording can be performed without wasting the recording area while ensuring the compatibility with the player etc. Moreover, it needs only a short processing time, necessary for the recording to ensure the compatibility with the player etc.

In one aspect of the information recording apparatus of the present invention, the information recording medium is disc-shaped, the writing controlling device controls the writing device to write a former half portion of each of the plurality of record information into the first recording layer in a recording direction from one side to the other side out of an inner circumferential side and an outer circumferential side of the information recording medium, and to write a latter half portion of each of the plurality of record information into the second recording layer by reversing the recording direction, and the border controlling device has: a first border controlling device for controlling the writing device to write first start border information (e.g. BI described later) which indicates a start border in the first recording layer of the former half portion, as one of the first border information, into the one side of the start border in the first recording layer, and to write or ensure second end border information (e.g. SBO described later) which indicates an end border in the second recording layer of the latter half portion, as one of the second border information, into the second recording layer in a same radial position as that of the first start border information, before or after writing of each of the plurality of record information; and a second border controlling device for controlling the writing device to write first end border information (e.g. BO described later) which indicates an end border in the first recording layer of the former half portion, as another one of the first border information, into the other side of the end border in the first recording layer, and to write or ensure second start border information (e.g. SBI described later) which indicates a start border in the second recording layer of the latter half portion, as another one of the second border information, into the second recording layer in a same radial position as that of the first end border information, before or after writing of each of the plurality of record information.

According to this aspect, by virtue of the writing device, under the control of the writing controlling device, the additional recording process is performed with respect to each of the plurality of record information, in an opposite manner by a unit of recording area which is divided by the border or the border zone and which is a "bordered area" described later (wherein the manner is merely referred to as an "in-zone opposite manner" hereinafter, as occasion demands).

In particular, under the control of the first border controlling device, the first start border information, e.g. the BI described later, which indicates the start border of the former half portion of the record information in the first recording layer, is written into the one side (e.g. inner circumferential side) of the start border of the first recording layer. Before or after this, the second end border information, e.g. the SBO described later, which indicates the end border of the latter half portion of the record information in the second recording layer, is written into or ensured in the second recording layer which is in the same radial position as that of the first start border information.

Moreover, under the control of the second border controlling device, the first end border information, e.g. the BO described later, which indicates the end border of the former half portion of the record information in the first recording layer, is written into the other side (e.g. outer circumferential side) of the end border of the first recording layer. Before or after this, the second start border information, e.g. the SBI described later, which indicates the start border of the latter half portion of the record information in the second recording layer, is written into or ensured in the second recording layer which is in the same radial position as that of the first end border information.

Incidentally, the "former half portion" and "latter half portion" of the record information do not mean a strict former half or latter half based on the middle position or center of the record information, but mean a former portion and a latter portion when the record information is divided into two so that the two portions have the same size or different sizes. A portion recorded into the first recording layer is the former half portion, and a portion recorded into the second recording layer is the latter half portion.

As a result, according to this aspect, the first start border information, which is the "border-in (BI)", and the first end border information, which is the "border-out (BO)", are written, as the "border zone", for example, into the first recording layer, wherein the first start border information indicates a data structure about from where to where the data is mainly written, and the first end border information has recorded buffer data with a length of about 0.5 mm in the radial direction or has a recorded jump prohibitive flag or indicates a next border or the like. Moreover, the second end border information, which is the "superficial border-in (SBI)", making a pair of the first start border information, and the second start border information, which is the "superficial border-out (SBO)", making a pair of the first end border information, are written into the second recording layer. Therefore, not only by the recorder etc. for writing the border zone, but also by the player etc., it is possible to reproduce the record information from the already-recorded area adjacent to the border zone. More specifically, by eliminating the unrecorded area adjacent to the already recorded record information in the each of the first and second recording layers, it is possible to avoid the situation, in each of the first and second recording layers, that an optical pickup of the player etc. jumps out from the recorded area to the unrecorded area which is spread the outer circumferential side thereof. Thus, the recording can be performed without wasting the recording area while ensuring the compatibility with the player etc., on the two-layer type or multilayer type information recording medium.

As a result, the recording can be performed without wasting the recording area while ensuring the compatibility with the player etc., and particularly, it is possible to make a more apparent effect of the compatibility and efficient recording, peculiar to the present invention, by performing the additional recording process in the "in-zone opposite manner".

In an aspect of the information recording apparatus provided with the first and second border controlling devices, the second border controlling device controls the writing device to write buffer data or a jump prohibitive flag, as at least one portion of the first end border information, in order to prevent a writing position by the writing device from deviating to the other side through the first end border information from the end border of the first recording layer.

By virtue of such construction, it is possible to prevent the writing position by the writing device, e.g. the optical pickup, from deviating to the other side, e.g. the outer circumferential side, from the end border of the first recording layer, by using the buffer data or the jump prohibitive flag as being at least one portion of the first end border information, upon reproduction by the player etc. or upon recording by the recorder etc.

In the aspect of the information recording apparatus provided with the first and second border controlling devices, the second border controlling device controls the writing device to write buffer data or a jump prohibitive flag, as at least one portion of the second start border information, in order to prevent a writing position by the writing device from deviating to the other side through the second start border information from the start border of the second recording layer.

By virtue of such construction, it is possible to prevent the writing position by the writing device, e.g. the optical pickup, from deviating to the other side, e.g. the outer circumferential side, from the start border of the second recording layer, by using the buffer data or the jump prohibitive flag as being at least one portion of the second start border information, upon reproduction by the player etc. or upon recording by the recorder etc.

In the aspect of the information recording apparatus provided with the first and second border controlling devices, the first border controlling device controls the writing device to write the second end border information as a copy of the first start border information.

By virtue of such construction, it is possible to obtain the same information as the first start border information as the copy thereof, by referring to the second end border information in the second recording layer, instead of referring to the first start border information in the first recording layer, upon reproduction by the player etc. or upon recording by the recorder etc. Thus, when the writing position and the reading position are in the second recording layer, it is possible to omit a process of layer jump or the like, in order to obtain the first start border information, such as the "border-in (BI)" which indicates a data structure about from where to where the data is mainly written, so that it is possible to perform a quick writing operation and reading operation.

In the aspect of the information recording apparatus provided with the first and second border controlling devices, the second border controlling device controls the writing device to write the second start border information as a copy of the first end border information.

By virtue of such construction, it is possible to obtain the same information as the first end border information as the copy thereof, by referring to the second start border information in the second recording layer, instead of referring to the first end border information in the first recording layer, upon reproduction by the player etc. or upon recording by the recorder etc. Thus, when the writing position and the reading position are in the second recording layer, it is possible to omit a process of layer jump or the like, in order to obtain the first end border information, such as the "border-out (BO)" which indicates a next border position or the like, so that it is possible to perform a quick writing operation and reading operation.

In the aspect of the information recording apparatus provided with the first and second border controlling devices, the first border controlling device controls the writing device to write the first start border information after the writing of each of the plurality of record information, and then to write or ensure the second end border information, and the second border controlling device controls the writing device to subsequently write the first end border information, and then to write or ensure the second start border information.

By virtue of such construction, for example, in recording one record information by the additional recording process, it is possible to efficiently perform, in a series of writing operations by the writing device, the recording of the record information into the first recording layer, the recording of the record information into the second recording layer, the recording of the first start border information (e.g. the BI) into the first recording layer, the recording of the second end border information (e.g. the SBO) into the second recording layer, the recording of the first end border information (e.g. the BO) into the first recording layer, and the recording of the second start border information (e.g. the SBI) into the second recording layer. In particular, it is possible to make a more apparent effect of the compatibility and efficient recording, peculiar to this construction, by performing the additional recording process in the "in-zone opposite manner".

In the aspect of the information recording apparatus provided with the first and second border controlling devices, the first border controlling device controls the writing device to write the first start border information into a lead-in area disposed in the first recording layer, as the one side of the start border in the first recording layer, and to write or ensure the second end border information in a lead-out area disposed in the second recording layer, with respect to first record information out of the plurality of record information.

By virtue of such construction, the first start border information (e.g. the BI) related to the first record information is written into the lead-in area and the second end border information (e.g. the SBO) related to the first record information is written into the lead-out area, so that it is possible to use a recording area without wasting it while ensuring the compatibility with the player etc., in the two-layer type or multilayer type information recording medium.

In another aspect of the information recording apparatus of the present invention, the border controlling device controls the writing device to ensure the second border information as a reserved information area.

According to this aspect, it is possible to treat the initial or previous recoding state of the information recording medium, as the recording state of the second border information even if the writing device does not specially perform a writing operation of writing the second border information. In other words, the second border information conceptually exists as different information from the record information in the second recording layer. Then, it is also possible to record other various control information or the like into the reserved information area, and the sophistication or high functioning of the apparatus can be performed by effectively using the reserved information area.

In another aspect of the information recording apparatus of the present invention, the writing controlling device controls the writing device to write one portion or all of each of the plurality of record information, near the second border information, as dummy data, into the second recording layer.

According to this aspect, by virtue of the writing device, under the control of the writing controlling device, one portion or all, which is near the second border information, of the record information (i.e., at least one portion adjacent to or on a near side to the second border information) as being the dummy data, is written into the second recording layer. Thus, in the case where the additional writing processes are performed at different opportunities, it is possible to avoid the situation that the record information cannot be reproduced by the player etc., by certainly preventing that the record-information-recorded area is made in the first recording layer and the unrecorded area is made in the second recording layer which is overlapped therewith, during the additional writing processes. On the other hand, it is enough to fill the unrecorded area of the second recording layer with the dummy data, as described above, by each unit of record information, so that it is possible to implement a process, quickly, as compared to the case where the unrecorded area is filled with the dummy data by a unit of information recording medium, as in the above-mentioned finalize process. Moreover, it is obviously possible to write once or additionally record next record information, as descried above, even after the filling with the dummy data, so that it is extremely useful, as compared to the finalize process which makes the subsequent additional recording impossible.

Incidentally, if the record information is assigned or allocated to the first and second recording layers in halves, basically, the process of filling the area with the dummy data is unnecessary. For example, if the border position can be predicted by the reverse calculation from the information amount of the record information to be recorded, there is little or almost no recording area to be filled with the dummy data in the second recoding layer. In practice, however, as represented by the extension of a recording time due to the extension of a game with respect to a reserved recording time in watching sports, for example, there may be an increase in the information amount of the record information to be recorded, after the start of the recording. Thus, the aspect of filling the area with the dummy data, as in this aspect, is greatly useful in practice, in an application to end the recording in accordance with a recording end command, for example.

In another aspect of the information recording apparatus of the present invention, the writing controlling device controls the writing device to write one portion of each of the plurality of record information, near the first border information, as dummy data, into the first recording layer, and to write all of each of the plurality of record information, as dummy data, into the second recording layer.

According to this aspect, by virtue of the writing device, under the control of the writing controlling device, one portion, which is near the first border information, of the record information (i.e., at least one portion adjacent to or on a near side to the second border information) as being the dummy data, is written into the first recording layer. Moreover, all of the record information as being the dummy data, is written into the second recording layer. Thus, in the case where the additional writing processes are performed at different opportunities, it is possible to avoid the situation that the record information cannot be reproduced by the player etc., by certainly preventing that the record-information-recorded area is made in the first recording layer and the unrecorded area is made in the second recording layer which is overlapped therewith, during the additional writing processes. On the other hand, it is enough to fill the unrecorded area of the second recording layer with the dummy data, as described above, by each unit of record information, so that it is possible to implement a process, quickly, as compared to the case where the unrecorded area is filled with the dummy data by a unit of information recording medium, as in the above-mentioned finalize process. Particularly in this case, the recording area filled with the dummy data, which is so-called a wasted recording area, is only within each unit of record information, so that it is relatively small. Moreover, it is obviously possible to write once or additionally record next record information, as descried above, even after the filling with the dummy data, so that it is extremely useful, as compared to the finalize process which makes the subsequent additional recording impossible.

(Information Recording Method)

The information recording method of the present invention will be discussed hereinafter.

The above object of the present invention can be also achieved by an information recording method in an information recording apparatus capable of recording a plurality of record information by using a writing device onto an information recording medium on which at least a first recording layer and a second recording layer are laminated, the information recording method provided with: a writing controlling process of controlling the writing device to write each of the plurality of record information such that each of the plurality of record information bridges over the first recording layer to the second recording layer; and a border controlling process of controlling the writing device to write first border information into a recording area which is a border between the plurality of record information in the first recording layer, and to write or ensure second border information in a recording area of the second recording layer, which is overlapped with the recording area of the first recording layer in which the first border information is written, as a recording area which is to be a border between the plurality of record information in the second recording layer.

According to the information recording method of the present invention, as in the case of the above-mentioned information recording apparatus of the present invention, the recording can be performed without wasting the recording area while ensuring the compatibility with the player etc. Moreover, it needs only a short processing time, necessary for the recording to ensure the compatibility with the player etc.

Incidentally, in response to the various aspects of the information recording apparatus of the present invention described above, the information recording method of the present invention can adopt various aspects.

(Computer Program)

The computer program of the present invention will be discussed hereinafter.

The above object of the present invention can be also achieved by a computer program of instructions for recording control and for tangibly embodying a program of instructions executable by a computer provided in the above-mentioned information recording apparatus of the present invention (including its various aspects), to make the computer function as at least one of the writing controlling device and the border controlling device.

According to the computer program of the present invention, the above-mentioned information recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects in the information recording apparatus of the present invention described above, the computer program of the present invention can adopt various aspects.

The above object of the present invention can be also achieved by a computer program product in a computer-readable medium for tangibly embodying a program of instructions executable by a computer provided in the above-mentioned information recording apparatus of the present invention (including its various aspects), to make the computer function as at least one of the writing controlling device and the border controlling device.

According to the computer program product of the present invention, the above-mentioned information recording apparatus can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the above-mentioned information recording apparatus.

These effects and other advantages of the present invention will become more apparent from the following embodiments.

As explained above, according to the information recording apparatus of the present invention, it is provided with: the writing device; the writing controlling device; and the border controlling device. According to the information recording method of the present invention, it is provided with: the writing controlling process; and the border controlling process. Therefore, the recording can be performed without wasting the recording area while ensuring the compatibility with the player etc.

BRIEF DESCRIPTION OF DRAWINGS

FIG. 1 are a substantial plan view showing the basic structure of an optical disc having a plurality of recording areas in an embodiment of an information recording medium of the present invention (FIG. 1(a)), and a schematic cross sectional view of the optical disc and a corresponding conceptual diagram showing a recording area structure in the radial direction (FIG. 1(b)).

FIG. 2 is a conceptual view schematically showing the recording structure of the optical disc if a border zone structure in the embodiment is applied.

FIG. 3 is a conceptual view schematically showing one example of the writing procedure of the optical disc if the border zone structure in the embodiment is applied.

FIG. 4 is a data structural view showing the detailed data structure of one border zone (i.e. BO and BI) in an L0 layer of the optical disc in the embodiment.

FIG. 5 is a data structural view showing the detailed data structure of one superficial border zone (i.e. SBI and SBO) in an L1 layer of the optical disc in the embodiment.

FIG. 6(a) and FIG. 6(b) are a cross sectional view conceptually showing a situation that the BO and the SBI in the embodiment are overlapped (FIG. 6(a)), and a cross sectional view conceptually showing a situation that the BI and the SBO in the embodiment are overlapped (FIG. 6(b)).

FIG. 7 is a conceptual view, having the same concept as that of FIG. 2 in a comparison example, schematically showing a recording structure related to the border zone of the optical disc.

FIG. 8 is a block diagram showing an embodiment of an information recording/reproducing apparatus of the present invention.

FIG. 9 is a flowchart showing a recording process in the embodiment.

FIG. 10 is a flowchart showing a reproduction process in the embodiment.

FIG. 11 is a conceptual view schematically showing the recording structure of the optical disc having the same concept as that of FIG. 2, in the embodiment.

DESCRIPTION OF REFERENCE CODES

100 . . . optical disc, 101 . . . lead-in area, 102 . . . data zone, 103 . . . lead-out area, 104 . . . middle area, 105 . . . border zone, 105$a$-0 . . . border-out, 105$b$-0 . . . border-in, 100S . . . transparent substrate, 106 . . . bordered area, 205 . . . superficial border zone, 205$a$ . . . superficial border-out (SBO), 205$b$ . . . superficial border-in (SBI), 300 . . . information recording/reproducing apparatus, 306 . . . data input/output control device, 307 . . . operation control device, 310 . . . operation button, 311 . . . display panel, 351 . . . spindle motor, 352 . . . optical pickup, 353 . . . signal recording/reproducing device, 354 . . . CPU (drive control device), 355 . . . memory, LB laser light

BEST MODE FOR CARRYING OUT THE INVENTION

Hereinafter, the best mode for carrying out the present invention will be discussed in order for each embodiment, with reference to the drawings.

Embodiments of the information recording apparatus and method, and the computer program of the present invention will be explained hereinafter with reference to the drawings, together with an information recording medium targeted for recording by the information recording apparatus and method of the present invention.

(Information Recording Medium and Recording/Reproduction Principle Thereof)

With reference to FIG. 1 to FIG. 7, the information recording medium targeted for recording by the information recording apparatus and method of the present invention will be discussed, together with the recording/reproduction principle thereof.

At first, with reference to FIG. 1(a) and FIG. 1(b), the basic structure of an optical disc in the embodiment of the recording medium of the present invention will be discussed. FIG. 1(a) is a substantial plan view showing the basic structure of an optical disc having a plurality of recording areas in the embodiment of the information recording medium of the present invention, and FIG. 1(b) is a schematic cross sectional view of the optical disc and a corresponding conceptual diagram showing a recording area structure in the radial direction.

As shown in FIG. 1(a) and FIG. 1(b), an optical disc 100 has a recording surface on a disc main body with a diameter of about 12 cm, as is a DVD. On the recording surface, the optical disc 100 is provided with: a lead-in area 101; a data area 102; and a lead-out area 103 or a middle area 104, with a center hole 1 as the center. Then, for example, on a transparent substrate 100S of the optical disc 100, there are laminated recording layers and the like. In each recording area of the recording layers, tracks 10, such as groove tracks and land tracks, are alternately placed, spirally or concentrically, with the center hole 1 as the center. On the track 10, data is divided and recorded by a unit of ECC block 11. The ECC block 11 is a data management unit by a pre-format address in which record information is error-correctable. The lead-in area 101 may be provided with: a PC (Power Calibration) area PCA for an OPC (Optimum Power Calibration) process; an RM (Recording Management) area RMA in which recording management information is recorded; and the like. The PCA and the RMA may be located on the disc inner circumferential side of the lead-in area 101.

Incidentally, the present invention is not particularly limited to the optical disc having these three areas. For example, even if the lead-in area 101, the lead-out area 103 or the middle area 104 does not exist, a data structure explained below can be constructed. Moreover, as described later, the lead-in area 101, the lead-out area 103 or the middle area 104 may be further segmentized.

Particularly, the optical disc 100 in the embodiment, as shown in FIG. 1(b), has such a structure that an L0 layer and an L1 layer, which constitute one example of the "first and second record layers" of the present invention as descried later, respectively, are laminated on the transparent substrate 100S. Upon the recording/reproduction of such a two-layer type optical disc 100, the recording/reproduction in the L0 layer or the L1 layer is performed, depending on which recording layer has the focus position of laser light LB, irradiated from the lower to upper side in FIG. 1(b). Moreover, the optical disc 100 in the embodiment is not limited to a two-layer single sided type, i.e., a dual layer type, but may be a two-layer double sided type, i.e., a dual layer double sided type. Furthermore, the optical disc 100 in the embodiment is not limited to the optical disc having the two recording layers, as described above, but may be an optical disc of a multilayer type which has three or more layers. Incidentally, a recording/reproducing procedure, peculiar to the embodiment, of recording in an in-zone opposite manner on the two-layer type optical disc and the data structure of each layer will be discussed later.

Next, with reference to FIG. 2 to FIG. 7, the recording/reproduction principle of the information recording apparatus and method of the present invention, which targets the optical disc having the structure in FIG. 1, will be discussed. FIG. 2 is a conceptual view schematically showing the recording structure of the optical disc if a border zone structure in the embodiment is applied. FIG. 3 is a conceptual view schematically showing one example of the writing procedure thereof.

As shown in FIG. 2, the optical disc 100 in the embodiment, one user data, which is one example of the "record information" of the present invention, such as a series of contents and one file, is recorded into the user data area 102 (refer to FIG. 1) in the in-zone opposite manner, so that it is recorded in one bordered area 106 in a form of a pair of user data 102-L and user data 102-L1. Each bordered area 106 is bridged over both the L0 layer and the L1 layer by recording the user data in the in-zone opposite manner. Each bordered area 106 is divided by a border zone 105 in the L0 layer, and by a superficial border zone 205 in the L1 layer.

More specifically, in the bordered area 106 (No. 1), the user data 102-L0, which is the former half portion of one user data area, is firstly recorded into the L0 layer, from the inner to the outer circumferential side of the optical disc 100. Then, the recording direction is reversed through a layer jump. Then, the user data 102-L1, which is the latter half portion of the one user data, is recorded into the L1 layer from the outer to the inner circumferential side of the optical disc 100. Afterwards, for example, at a different opportunity, in the bordered area 106 (No. 2), the former half portion and the latter half portion of the user data are separately recorded into the L0 layer and the L1 layer, respectively, in the in-zone opposite manner, as in the bordered area 106 (No. 1).

The border zone 105, which divides the L0 layer, has a BO (Border-Out) and a BI (Border-In). The superficial border zone 205 has a SBO (Superficial Border-Out) and a SBI (Superficial Border-In). The detailed specific example thereof will be discussed later in detail (refer to FIG. 4 to FIG. 6).

In the embodiment, the BO and the BI are one example of the "first border information" of the present invention. Out of them, the BO is one example of the "first end border information" of the present invention, and the BI is one example of the "first start border information" of the present invention. Moreover, the SBO and the SBI are one example of the "second border information" of the present invention. Out of them, the SBO is one example of the "second end border information" of the present invention, and the BI is one example of the "second start border information" of the present invention.

Particularly in the embodiment, the superficial border zone 205 in the L1 layer is located in the same radial position or in the same radial area as that of the border zone 105 in the L0 layer. More specifically, the SBI in the L1 layer is located in the same radial position or in the same radial area as that of the BO in the L0 layer, and the SBO in the L1 layer is located in the same radial position or in the same radial area as that of the BI in the L0 layer.

Incidentally, in the bordered area nearer the most inner circumference (i.e. the bordered area 106 (No. 1) in FIG. 2), an EBI (Extra BI) is located in the lead-in area (LI) 101 of the L0 layer, as a type of the BI, and a ESBO (Extra SBO) is located in the lead-out (LO) 103 of the L1 layer, as a type of the SBO. Thus, it is unnecessary to provide areas exclusive for the BI and the BO, near the most inner circumference of the user data area 102 (refer to FIG. 1).

The writing onto the optical disc 100 having the data structure shown in FIG. 2 is performed in a procedure shown in FIG. 3 in the in-zone opposite manner, for example.

In FIG. 3, in the order of circled numbers "1" to "6" (hereinafter abbreviated to "circle 1" or "circle 6", etc.), and as shown in the detailed order or the recording direction with arrows in FIG. 3, at first, "circle 1", the user data is written in the order of the user data 102-L0 to the user data 102-L1, as the recording procedure of recording the user data into the border area 106 (No. 1). In other words, after the writing of the user data into the L0 layer toward the outer circumferential side and the layer jump, the writing is performed into the L1 layer toward the inner circumferential side. Then, "circle 2", through the layer jump again, the EBI is written into the L0 layer, and again through the layer jump, the ESBO is written into the L1 layer. Incidentally, the writing of the ESBO or EBI may be actually performed by ensuring (or reserving) or assigning an area for the ESBO or EBI in the L0 or LI. Then, "circle 3", the layer jump is performed again and the writing position is displaced to the outer circumferential side, to thereby write the BO into the L0 layer, and again through the layer jump, the SBI is written into the L1 layer. Incidentally, the writing of the SBI may be actually performed by ensuring or assigning an area for the SBI in the LI. Particularly at this time, the SBI is written into the same radial position as that of the BO. By the above-mentioned writing procedure of the "circle 1" to "circle 3", the writing of one user data in the in-zone opposite manner is completed with respect to the bordered area 106 (NO. 1) at the same opportunity.

Afterwards, as the recording procedure of recording the user data into the bordered area 106 (NO. 2) at the same or different opportunity, "circle 4", after the writing of the user data area into the L0 layer and the layer jump in the bordered area 106 (No. 2), the writing of the user data is performed into the L1 layer, in the same manner as the "circle 1". Then, "circle 5", through the layer jump again, the BI is written into the L0 layer and the SBO is written into the L1 layer, in the same manner as the "circle 2". Then, "circle 6", the layer jump is performed again and the writing position is displaced to the outer circumferential side, to thereby write the BO into the L0 layer and the SBI into the L1 layer, in the same manner as the "circle 3". At this time, the SBO is written into the same radial position as that of the BI. By the above-mentioned writing procedure of the "circle 4" to "circle 6", the writing of one user data in the in-zone opposite manner is completed with respect to the bordered area 106 (NO. 2).

Incidentally, the present invention is not limited to the writing procedure in the in-zone opposite manner shown in FIG. 3. For example, in. FIG. 2 and FIG. 3, if the BO and the SBI are overlapped, or the BI and the SBO are overlapped, the effect of the present invention can be obtained properly. In particular, it is possible to obtain the effect that the information on the optical disc 100 with the bordered area 106 (No. 1) already recorded and the bordered area 106 (No. 2) unrecorded, can be reproduced by the player etc., without the writing procedure as illustrated in FIG. 3.

Next, with reference to FIG. 4, a detailed data structure will be discussed in the specific example of the border zone 105 shown in FIG. 2 and FIG. 3. FIG. 4 is a data structural view showing the detailed data structure of one border zone (i.e. BO and BI) in the L0 layer of the optical disc in the embodiment.

As shown in FIG. 4, a border zone 105-0, which is one specific example of the border zone 105, is provided with: a border-out 105a-0; and a border-in 105b-0. The information amount of the border zone 105-0 is "2944" ECC blocks if the width=for about 0.5 mm, and "608" ECC blocks if the width=for about 0.1 mm.

In the border-in 105b-0, data for control or recording management which has an information amount of the newest "5" ECC blocks is recorded. The data structure of the data for control or recording management is the same as that of the data for control or recording management recorded in the lead-in area. Incidentally, a BSGA (Block SYNC Guard Area) disposed in the last position of the border-in 105b-0 is recorded in order to guarantee that, if the data for control or recording management in the border-in is unrecorded, its adjacent, already recorded ECC block can be reproduced.

The border-out 105a-0 is further provided with: a border RMD area 105d-0; a stop block SB; three next border markers NM; and a buffer area including buffer data.

In the border RMD area 105d-0, there are copied and recorded the data for recording management, such as the newest RMD (Recording Management Data), by an information amount of "5" ECC blocks. The border RMD area 105d-0 can provide management information or the like for reproducing the information recorded in the border, for a DVD-ROM reproduce-only drive which cannot read the RM area in the lead-in area of a DVD-R, for example.

The stop block SB has an information amount of "2" ECC blocks and is relatively located on the 38th and 39th from the start position of the border-out 105a-0. The attribute of the stop block SB area is the same as that of the lead-out area. This is to allow an optical pickup to recognize the same area as the lead-out area and to prevent the runaway of the optical pickup.

Each of the next border markers NM has an information amount of "2" ECC blocks. By virtue of the next border marker NM, it is possible to judge whether or not there is a next border. Specifically, if there is no next border and the lead-out area has not been recorded yet, the next border marker NM of the border-out located in the last position is unrecorded. Moreover, in the border close process, for example, "00h" is recorded in each next border marker NM of the border-out located in the second last position. Furthermore, in a finalize process, for example, "00h" is padded in each next border marker NM of the last border-out, and the attribute of each next border maker NM is made the same as that of the lead-out area. Incidentally, in the case of a DVD-RW, there is no next border marker NM.

Incidentally, in FIG. 4, the reserved area of the border-out 105a-0 or the reserved area of the border-in 105b-0 constitutes one example of the "buffer data" of the present invention; however, in the reserved area, there may be provided a jump prohibitive flag for preventing the optical pickup from jumping from the inner to the outer circumferential side, or from the outer to the inner circumferential side. By virtue of such construction, it is possible to more certainly prevent such a situation that the optical pickup deviates from the bordered area targeted for the current reproduction or recording, by the jump prohibitive flag, upon reproduction by the player etc. or upon recording by the recorder etc.

Next, with reference to FIG. 5, a detailed data structure will be discussed in the specific example of the superficial border zone 105 shown in FIG. 2 and FIG. 3. FIG. 5 is a data structural view showing the detailed data structure of one superficial border zone (i.e. SBI and SBO) in the L1 layer of the optical disc in the embodiment.

As shown in FIG. 5, a superficial border zone 205-1, which is one specific example of the superficial border zone 205, is provided with: a SBO (Superficial Border-Out) 205a-1; and a SBI (Superficial Border-In) 205b-1. The information amount of the superficial border zone 205-1 is, as in the case of the border zone 105-0 (refer to FIG. 4), for example, "2944" ECC blocks if the width=for about 0.5 mm, and "608" ECC blocks if the width=for about 0.1 mm. Incidentally, the term "superficial" of the superficial border zone 205 means apparent, surface, a feature of lying on only the outer layer of something, or insubstantial. In the embodiment, since it always makes a pair with the border zone 105, the reproduction can be performed without any problem even if the content itself of the superficial border zone 205 is not particularly referred to. In consideration of this, the term "superficial" has a concept that it is enough if the user data area 102 (refer to FIG. 1) of the L1 layer which overlaps the border zone 105 is ensured or assigned as the superficial border zone 205 without writing the user data thereinto. In other words, as long as used to make a pair with genuine user zone 105, the superficial border zone 205 may be allowed to be provided as an apparent or formal border zone. However, in the reproduction, it is obviously possible to refer to various control information written in the superficial border zone 205, so that the superficial border zone 205 is not always insubstantial.

In the superficial border-in 205b-1, there is provided the stop block SB having an amount of "2" ECC blocks, which is relatively located on the 38th and 39th from the start position of the SBI 205a-1, in the reserved area. Such a wide reserved area functions as the buffer area. The attribute of the stop block SB area is the same as that of the lead-out area. This is to allow an optical pickup to recognize the same area as the lead-out area and to prevent the runaway of the optical pickup.

On the other hand, the SBO 205a-1 is provided with a reserved area having an amount of "6" ECC blocks, and functions as the buffer area. A 32 kB of linking loss area is provided between the SBO 205a-1 and the SBI 205b-1.

Incidentally, in FIG. 5, the reserved area of the SBO 205a-1 or the reserved area of the SBI 205b-1 constitutes one example of the "buffer data" of the present invention; however, in the reserved area, there may be provided a jump prohibitive flag for preventing the optical pickup from jumping from the inner to the outer circumferential side, or from the outer to the inner circumferential side. By virtue of such construction, it is possible to more certainly prevent such a situation that the optical pickup deviates from the bordered area targeted for the current reproduction or recording, by the jump prohibitive flag, upon reproduction by the player etc. or upon recording by the recorder etc.

In addition, in FIG. 5, the same information content of the border-out 105a-0 shown in FIG. 4, i.e. the copy of it, may be written into the reserved area of the SBI 205b-1. By virtue of such construction, it is possible to obtain the same information as the first start border information by referring to the second end border information in the second recording layer, as the copy of it, instead of referring to the first start border information in the first recording layer upon reproduction by the player etc. or upon recording by the recorder etc. From the same point of view, in FIG. 5, the same information content of the border-in 105b-0 shown in FIG. 4, i.e. the copy of it, may be written into the reserved area of the SBO 205a-1.

Next, with reference to FIG. 6(a) and FIG. 6(b), the overlapped structure, as viewed from the normal direction of a disc surface, will be discussed, in one specific example of the border zone 105 and the superficial border zone 205 shown in FIG. 2 and FIG. 3. FIG. 6(a) and FIG. 6(b) are a cross sectional view conceptually showing a situation that the BO 105a and the SBI 205b are overlapped (FIG. 6(a)), and a cross sectional view conceptually showing a situation that the BI 105b and the SBO 205a are overlapped (FIG. 6(b)).

In FIG. 6(a), the SBI 205b located in the L1 layer has the BSGA at the end on the inner circumferential side thereof, as in the case of the border-in 105b-0 illustrated in FIG. 4. The border zone 105a and the superficial border zone 205b are overlapped such that the BSGA is in the same radial position as that of the linking loss area (LILA) provided for the BO 105a located in the L0 layer. Incidentally, a COR #0, a COR #1, and so on have the same content as already illustrated in FIG. 4. Thus, both the BO 105a and the SBI 205b can surely prevent the optical pickup, which is displaced from the inner circumferential side, from jumping out to the outer circumferential side.

In FIG. 6(b), the SBO 205a located in the L1 layer has the linking loss area (LLA) at the end on the outer circumferential side thereof. The border zone 105a and the superficial border zone 205b are overlapped such that the linking loss area is in the same radial position as that of the BSGA provided for the BI 105b located in the L0 layer. Incidentally, an UPI #0, an UPI #1, and so on have the same content as already illustrated in FIG. 4. Thus, both the BI 105b and the SBO 205a can surely prevent the optical pickup, which is displaced from the outer circumferential side, from jumping out to the inner circumferential side.

Consequently, according to the embodiment, both the BO to be recorded into the L0 layer and the SBI to be recorded into the L1 layer are recorded as a pair of border information, in the data areas which are overlapped with each other. Moreover, both the BI to be recorded into the L0 layer and the SBO to be recorded into the L1 layer are recorded as a pair of border information, in the data areas which are overlapped. Therefore, in the case where the additional writing processes are performed at different opportunities, it is possible to avoid the situation that the user data cannot be reproduced by the player etc., by making the user-data-recorded area in the L0 layer and making the unrecorded area in the L1 layer which is overlapped therewith, during the additional writing processes. In particular, it is possible to effectively avoid the situation that the function of the border zone deteriorates or disappears, by making the user-data-recorded area in the L0 layer and making the unrecorded area in the L1 layer which is overlapped therewith. Thus, even during the additional writing processes performed at different opportunities, it is possible to surely read one user data, which is already recorded in the data area 102 (refer to FIG. 1), in the bordered area, so that the compatibility can be ensured between the recorder etc. and the player etc. Moreover, a process like the finalize process is no longer required in order to realize the compatibility between the recorder etc. and the player etc.

Now, with reference to FIG. 7, some consideration is given to such an effect in the embodiment. FIG. 7 is a conceptual view, having the same concept as that of FIG. 2 in a comparison example, schematically showing a recording structure related to the border zone of the optical disc.

In FIG. 7, the optical disc in the comparison example is a two-layer type optical disc in the opposite manner to which the structure of the border zone, adopted in the single-layer type optical disc, is applied to perform recording. Thus, user data 102", BO (Border-Out), and BI (Border-In) are recorded into bordered areas 106" (No. 1), 106" (NO. 2), and 106" (No. 3), respectively. The border zone 105 which forms the border or boundary of the user data 102" is provided with the BO and the BI. Following the last BO in the L1 layer, there is an unrecorded area 210.

According to the comparison example, as long as the unrecorded area 210 remains in the L1 layer, it is impossible to read, by the player etc., the information recorded in the already recorded user data area in the L0 layer which is spread in the same radial position as that of the unrecorded area 210. In other words, in this case, the compatibility cannot be ensured between the recorder etc. and the player etc. On the contrary, if the dummy data or the like is written into the unrecorded area 210 of the L1 layer which follows the last BO and a process like the finalize process is performed, it is possible to read the user data on the player etc. However, once the finalize process or the like is performed, it is no longer possible to write the user data into the data area which follows the last BO. As described above, according to the comparison example, if the recording is performed onto the two-layer type optical disc in the opposite manner, the additional recording process cannot be performed in order to realize the compatibility with the player etc., and on the contrary, in order to realize the additional recording process, the compatibility cannot be ensured with the player etc.

As opposed to this, in the above-mentioned embodiment, the border zone in the L0 layer and the superficial border zone in the L1 layer are disposed in the same radial position to make a pair, so that there is not any disadvantage that the comparison example has, and it is possible to perform the additional recording process while realizing the compatibility with the player etc. In particular, if the recording is performed on the two-layer type optical disc in the in-zone opposite manner, it is possible to record without wasting the user data area. Moreover, it is possible to reduce a processing time, necessary for the recording to ensure the compatibility with the player etc.

(Information Recording/Reproducing Apparatus)

Next, with reference to FIG. 8, the structure of an information recording/reproducing apparatus 300 in the embodiment of the information recording apparatus of the present invention will be discussed. FIG. 8 is a block diagram showing the information recording/reproducing apparatus in the embodiment. Incidentally, the information recording/reproducing apparatus 300 has a function of recording the record data onto the optical disc 100 and a function of reproducing the record data recorded on the optical disc 100.

With reference to FIG. 8, the inner structure of the information recording/reproducing apparatus 300 will be discussed. The information recording/reproducing apparatus 300 is an apparatus for recording the information onto the optical disc 100 and reading the information recorded on the optical disc 100, under the control of a CPU (Central Processing Unit).

The information recording/reproducing apparatus 300 is provided with: the optical disc 100; a spindle motor 351; an optical pickup 352; a signal recording/reproducing device 353; a CPU (drive control device) 354; a memory 355; a data input/output control device 306; an operation control device 307; an operation button 310; a display panel 311; and a bus 357.

In particular, the former half portion of the written constitutional elements, i.e., the spindle motor 351, the optical pickup 352, the signal recording/reproducing device 353, the CPU (drive control device) 354, and the memory 355 may constitute a disc drive (hereinafter referred to as a "drive", as occasion demands). Moreover, the latter half portion of the written constitutional elements, i.e., the data input/output control device 306, the operation control device 307; the operation button 310, and the display panel 311 may constitute a host computer (hereinafter referred to as a "host", as occasion demands). Alternatively, the CPU (drive control device) 354 and the bus 357 may constitute the communicating device of the present invention.

The spindle motor 351 is intended to rotate and stop the optical disc 100, and operates upon accessing the optical disc. More specifically, the spindle motor 351 is constructed to rotate and stop the optical disc 100 at a predetermined speed, under spindle servo from a not-illustrated servo unit or the like.

The optical pickup 352 is to perform the recording/reproduction with respect to the optical disc 100, and is provided with a semiconductor laser device, a lens, and the like. More specifically, the optical pickup 352 irradiates the optical disc 100 with a light beam, such as a laser beam, as reading light with a first power upon reproduction, and as writing light with a second power upon recording, with it modulated.

The signal recording/reproducing device 353 controls the spindle motor 351 and the optical pickup 352, to thereby perform the recording/reproduction with respect to the optical disc 100. More specifically, the signal recording/reproducing device 353 is provided with: a laser diode (LD) driver; a head amplifier; and the like, for example. The laser diode driver (LD driver) drives a not-illustrated semiconductor laser device located in the optical pickup 352. The head amplifier amplifies the output signal of the optical pickup 352, i.e. the reflective light of a light beam, and outputs the amplified signal. More specifically, the signal recording/reproducing device 353 drives the not-illustrated semiconductor laser device located in the optical pickup 352, in order to determine an optimum laser power by the recording and reproduction processes for the OPC pattern, together with a not-illustrated timing generator or the like, under the CPU 354, upon the OPC process. In particular, the signal recording/reproducing device 353 constitutes one specific example of the "writing device" of the present invention, with the optical pickup 352.

The memory 355 is used in the whole data processing and the OPC process or the like on the information recording/reproducing apparatus 300, including a buffer area for the record/reproduction data, an area used as an intermediate buffer when data is converted into the data that can be used on the signal recording/reproducing device 353, and the like. Moreover, the memory 355 is provided with: a ROM area into which a program for performing an operation as a recording device, i.e. firmware, is stored; a buffer used for compression/decompression of video data; a RAM area into which a parameter required for the operation of a program or the like is stored; and the like.

The CPU 354 is connected to the signal recording/reproducing device 353 and the memory 355 through the bus 357, and controls the entire information recording/reproducing apparatus 300 by giving an instruction to each controlling device. In general, software or firmware for operating the CPU 354 is stored in the memory 355. In particular, the CPU 354 constitutes one example of the "writing controlling device" and the "border controlling device" of the present invention, by virtue of the computer program recorded in the memory 355.

The data input/output control device 306 controls the input/output of the data from the exterior with respect to the information recording/reproducing apparatus 300, to thereby perform storage to and export from the data buffer on the memory 355. If the input/output of the data is a video signal, the data input/output control device 306 compresses (encodes) the data received from the exterior in a MPEG format, for example, and outputs it to the memory 355, upon data inputting. Upon data outputting, it decompresses (decodes) the encoded data in the MPEG format or the like received from the memory 355, and outputs it to the exterior.

The operation control device 307 receives an operation instruction and performs display with respect to the information recording/reproducing apparatus 300, and transmits an instruction by the operation button 310, such as an instruction to record or reproduce, to the CPU 354, and outputs the operation state of the information recording/reproducing apparatus 300, such as during recording and during reproduction, to the display panel 311, such as a fluorescent tube. In particular, in the embodiment, the operation control device 307 may be provided with a not-illustrated CPU and memory or the like, as the host computer of the present invention.

One specific example of the information recording/reproducing apparatus 300, as explained above, is household equipment, such as recorder equipment for recording and reproducing video images. The recorder equipment records a video signal from a broadcast reception tuner and an external connection terminal, onto a disc, and outputs the video signal reproduced from the disc to external display equipment, such as a television. The operation as the recorder equipment is performed by executing a program stored in the memory 355, on the CPU 354.

(Recording Operation of Information Recording/Reproducing Apparatus)

Next, with reference to FIG. 8 and FIG. 9, the recording operation of the above-mentioned information recording/reproducing apparatus will be discussed. FIG. 9 is a flowchart showing a recording process in the embodiment.

In FIG. 9, at first, the optical disc 100 is loaded (step S11). Then, a seek operation is performed by the optical pickup 352 under the control of the CPU 354. Then, various management information necessary for the recording process with respect to the optical disc 100 is obtained. At the same time, after it is confirmed that the user data or the like is additionally recorded or written once, with the optical disc 100 as a DVD-R/RW, for example, the additional recording is started onto the optical disc 100. In other words, here, the writing of one user data is performed in the in-zone opposite manner, as explained with reference to FIG. 3 (step S12). During the writing of the user data, if the writing of the former half portion of the one user data is ended into the L0 layer, the layer jump is performed, and then, the latter half portion of the one user data is performed into the L1 layer. Incidentally, the one user data is a group of user data having an information amount scheduled to be recorded into one border area in advance, and one TV program or show corresponds to it, for example. However, because of a schedule change, if the recording cannot be performed in one bordered area after the start of the writing or after the reverse of the recording direction, a next bordered area may be set to continue the writing, so that there is not particularly any problem. Then, during the writing, it is monitored whether or not the writing is ended in the latter half portion of the one user data with respect to the L1 layer, i.e., in the entire one user data which is scheduled (step S13).

If the writing is ended (the step S13: Yes), the writing or the like of the extra border-in (EBI) or border-in (BI) is performed (step S14). Specifically, in the case of the first user data, which is recorded for the first time on the optical disc 100, the extra border-in (EBI) is written in the lead-in area, and at the same time, the extra superficial border-out is ensured in the read-out area as an area which is overlapped with the extra border-in (EBI). On the other hand, in the case of the second or more user data, the border-in (BI) is written in the data area of the L0 layer, and at the same time, the superficial border-out (SBO) is written in the data area of the L1 layer, in an area which is overlapped with the BI.

Then, the border-out (BO) and the superficial border-in (SBI) are written (step S15), and a series of recording process is ended.

If the recording process is performed in the above manner, such an optical disc is constructed that is a two-layer type optical disc on which the recording is performed in the in-zone opposite manner and that the border zone of the L0 layer and the superficial border zone of the L1 layer are recorded in the same radial position, as explained with reference to FIG. 1 to FIG. 6. Moreover, the recording process itself can be efficiently performed by a series of writing operations, by adopting the in-zone opposite manner.

(Reproduction Operation of Information Recording/Reproducing Apparatus)

Next, the reproduction operation of the above-mentioned information recording/reproducing apparatus will be discussed with reference to FIG. 8 and FIG. 10. FIG. 10 is a flowchart showing a reproduction process in the embodiment.

Incidentally, the reproduction operation of the above-mentioned information recording/reproducing apparatus which belongs to the recorder etc. will be discussed; however, the reproduction operation of the player etc. is also the same. In other words, even in the case of the player etc., the reproduction can be performed without any problem by the player etc., even if the unrecorded area remains outside the bordered area which is already recorded by the recording process of FIG. 9, in the data area; namely, even if the finalize process is not performed.

In FIG. 10, at first, the optical disc 100 is loaded (step S21). Then, a seek operation is performed by the optical pickup 352 under the control of the CPU 354. Then, various management information necessary for the reproduction process with respect to the optical disc 100 is obtained. Particularly in the embodiment, the reading or the like of the extra border-in (EBI) or border-in (BI) is performed. Specifically, in the case where the first user data, which is recorded for the first time on the optical disc 100, is read, the extra border-in (EBI) is read in the lead-in area. On the other hand, in the case where the second or more user data is read, the corresponding border-in (BI) is read in the data area of the L0 layer (step S22).

As a result, one user data which is already recorded in the in-zone opposite manner, as explained with reference to FIG. 3, is read (step S23). During the reading, if the reading of the former half portion of the one user data in the L0 layer is ended, the layer jump is performed, and then, the latter half portion of the one user data in the L0 layer is read. Then, during the reading, it is monitored whether or not the reading is ended in the latter half portion of the one user data in the L1 layer; namely, in the entire one user data which is scheduled (step S24).

If the reading is ended (the step S24: Yes), a series of reproduction process is ended.

By virtue of the above-mentioned reproduction process, the reproduction is performed without any problem on such an optical disc that is a two-layer type optical disc on which the recording is performed in the in-zone opposite manner and that the border zone of the L0 layer and the superficial border zone of the L1 layer are recorded in the same radial position, as explained with reference to FIG. 1 to FIG. 6. Particularly in this case, even if the reproducing apparatus is the player etc. which is not the recorder etc. which even performs the recording process, it can perform the reproduction process in the same manner as in FIG. 10. In other words, the compatibility is ensured between the recorder etc. and the player etc. as shown in FIG. 8, so that it is greatly useful.

Modified Example of Information Recording Medium

Next, a modified example of the embodiment of the above-mentioned information recording medium will be discussed with reference to FIG. 11. FIG. 11 is a conceptual view schematically showing the recording structure of the optical disc having the same concept as that of FIG. 2, in the embodiment.

On the two-layer type optical disc 100 in the above-mentioned embodiment, as shown in FIG. 2, each of the bordered areas 106 (No. 1), 106 (No. 2), and so on is filled with the user data which is scheduled to be recorded. This is to start or progress the recording after the position of the border zone is determined by the reverse calculation from the information amount of one user data to be recorded in advance, before the recording or at the initial stage of the recording. By recording in this manner, the data area 102 of the L1 layer which is overlapped with the recorded data area 102 of the L0 layer is not unrecorded, in each of the bordered areas 106 (No. 1), 106 (No. 2), and so on, so that it is convenient. However, because of a schedule change after the start of the recording, the information amount of the user data to be recorded may change in some cases.

Thus, as shown in FIG. 11, in the modified example of the above-mentioned embodiment, if an unrecorded area 102D is generated for some reasons, as shown in hatching, in each of the bordered areas 106 (No. 1), 106 (No. 2), and so on, then, the unrecorded area 102D is filled with the dummy data.

By virtue of such construction, the recording capacity of the data area 102 is wasted, only by the filling part of the unrecorded area 102D with the dummy data; however, the reproduction can be performed without any problem even by the player etc., in the same reproduction process as shown in FIG. 10, on the optical disc 100 including the filling part with the dummy data. In other words, it is possible to ensure the compatibility. Then, as compared to the case where a process of filling the entire optical disc with the dummy data is performed, as in the finalize process, to make the situation that the additional recording cannot be performed at least ever again, it is only to fill the unrecorded area 102D with the dummy data by a unit of the bordered area. Thus, the size of the wasted data area 102 is far small. Moreover, the additional recoding process can be performed in a next bordered area even after the process of filling the unrecorded area 102D with the dummy data, so that it is dramatically advantageous.

Incidentally, as seen from FIG. 11, the process of filling the unrecorded area 102D with the dummy data is generally started from the middle of the L1 layer or performed in the entire L1 layer. However, it may be started from the middle of the L0 layer. In any case, if an unscheduledly shorten recording process is performed, it is possible to make good use of the recording capacity of the optical disc 100 as much as possible, so that it is greatly advantageous.

Incidentally, in the embodiments, the information recording/reproducing apparatus for a write-once type optical disc, such as a two-layer type DVD-R, is explained as one specific example of the information recording apparatus. The present invention, however, can be applied to an information recording/reproducing apparatus for a rewritable type optical disc, such as a two-layer type DVD-RW. In addition, for example, it can be also applied to an information recording/reproducing apparatus for a multiple layer type optical disc, such as a three layer type. Moreover, it can be applied to an information recording/reproducing apparatus for a large-capacity recording medium, such as a disc which uses blue laser for recording and reproduction.

According to the embodiments explained above in detail, the recording can be performed without wasting the recording area while ensuring the compatibility with the player etc., in each recording layer on the two-layer type or multilayer-type optical disc.

The present invention is not limited to the above-described embodiments, and various changes may be made, if desired, without departing from the essence or spirit of the invention which can be read from the claims and the entire specification. A recording apparatus and method, and a computer program for recording control, all of which involve such changes, are also intended to be within the technical scope of the present invention.

Industrial Applicability

The recording apparatus and method, and the computer program according to the present invention can be applied to an information recording apparatus, such as a DVD recorder. Moreover, they can be applied to an information recording apparatus or the like which is mounted on various computer equipment for consumer use or for commercial use, or which can be connected to various computer equipment.

The invention claimed is:

1. An information recording apparatus capable of recording at least first and second user data onto an information recording medium on which at least a first recording layer and a second recording layer are laminated, said information recording apparatus comprising:

a writing device capable of writing each of the first and second user data;

a writing controlling device for controlling said writing device to write each of the first and second user data such that each of the first and second user data bridges over the first recording layer to the second recording layer; and a border controlling device for controlling said writing device to write first border information into a recording area which is a border between the first and second user data in the first recording layer, and to write or ensure second border information in a recording area of the second recording layer, which is overlapped with the recording area of the first recording layer in which the first border information is written, as a recording area which is to be a border between the first and second user data in the second recording layer, wherein each of the first recording layer and the second recording layer includes a user data area, said border controlling device controls said writing device (i) to write the first border information in the user data area of the first recording layer and (ii) to write the second border information in the user data area of the second recording layer, the information recording medium is disc-shaped, said writing controlling device controls said writing device to write a former half portion of each of the first and second user data into the first recording layer in a recording direction from one side to the other side out of an inner circumferential side and an outer circumferential side of the information recording medium, and to write a latter half portion of each of the first and second user data into the second recording layer by reversing the recording direction, and said border controlling device has:

a first border controlling device for controlling said writing device to write first start border information which indicates a start border in the first recording layer of the former half portions, as one of the first border information, into the one side of the start border in the first recording layer, and to write or ensure second end border information which indicates an end border in the second recording layer of the latter half portion, as one of the second border information, into the second recording layer in a same radial position as that of the first start border information, after writing of each of the first and second user data; and a second border controlling device for controlling said writing device to write first end border information which indicates an end border in the first recording layer of the former half portion, as another one of the first border information, into the other side of the end border in the first recording layer, and to write or ensure second start border information which indicates a start border in the second recording layer of the latter half portion, as another one of the second border information, into the second recording layer in a same radial position as that of the first end border information, after writing of each of the first and second user data, said second border controlling device controls said writing device to write buffer data or a jump prohibitive flag, as at least one portion of the first end border information, in order to prevent a writing position by said writing device from deviating to the other side through the first end border information from the end border of the first recording layer, said first border controlling device controls said writing device to write the first start border information after the writing of each of the first and second user data, and then to write or ensure the second end border information after the writing of the first start border information, and said second border controlling device controls said writing device to subsequently write the first end border information after the writing or the ensuring of the second end border information, and then to write or ensure the second start border information after the writing of the first end border information.

2. The information recording apparatus according to claim 1, wherein said second border controlling device controls said writing device to write buffer data or a jump prohibitive flag, as at least one portion of the second start border information, in order to prevent a writing position by said writing device from deviating to the other side through the second start border information from the start border of the second recording layer.

3. The information recording apparatus according to claim 1, wherein said first border controlling device controls said writing device to write the second end border information as a copy of the first start border information.

4. The information recording apparatus according to claim 1, wherein said second border controlling device controls said writing device to write the second start border information as a copy of the first end border information.

5. The information recording apparatus according to claim 1, wherein said first border controlling device controls said writing device to write the first start border information into a lead-in area disposed in the first recording layer, as the one side of the start border in the first recording layer, and to write or ensure the second end border information in a lead-out area disposed in the second recording layer, with respect to first user data out of the first and second user data.

6. The information recording apparatus according to claim 1, wherein said border controlling device controls said writing device to ensure the second border information as a reserved information area.

7. The information recording apparatus according to claim 1, wherein said writing controlling device controls said writing device to write one portion or all of each of the first and second user data, near the second border information, as dummy data, into the second recording layer.

8. The information recording apparatus according to claim 1, wherein said writing controlling device controls said writing device to write one portion of each of the first and second user data, near the first border information, as dummy data, into the first recording layer, and to write all of each of the first and second user data, as dummy data, into the second recording layer.

9. An information recording method in an information recording apparatus capable of recording at least first and second user data by using a writing device onto an information recording medium on which at least a first recording layer and a second recording layer are laminated, said information recording method comprising:

a writing controlling process of controlling said writing device to write each of the first and second user data such that each of the first and second user data bridges over the first recording layer to the second recording layer; and a border controlling process of controlling said writing device to write first border information into a recording area which is a border between the first and second user data in the first recording layer, and to write or ensure second border information in a recording area of the second recording layer, which is overlapped with the recording area of the first recording layer in which the first border information is written, as a recording area which is to be a border between the first and second user data in the second recording layer, wherein each of the first recording layer and the second recording layer includes a user data area, said border controlling process controls said writing device (i) to write the first border information in the user data area of the first recording layer and (ii) to write the second border information in the user data area of the second recording layer, the information recording medium is disc-shaped, said writing controlling process controls said writing device to write a former half portion of each of the first and second user data into the first recording layer in a recording direction from one side to the other side out of an inner circumferential side and an outer circumferential side of the information recording medium, and to write a latter half portion of each of the first and second user data into the second recording layer by reversing the recording direction, and said border controlling process has:

a first border controlling process of controlling said writing device to write first start border information which indicates a start border in the first recording layer of the former half portions, as one of the first border information, into the one side of the start border in the first recording layer, and to write or ensure second end border information which indicates an end border in the second recording layer of the latter half portion, as one of the second border information, into the second recording layer in a same radial position as that of the first start border information, after writing of each of the first and second user data; and a second border controlling process of controlling said writing device to write first end border information which indicates an end border in the first recording layer of the former half portion, as another one of the first border information, into the other side of the end border in the first recording layer, and to write or ensure second start border information which indicates a start border in the second recording layer of the latter half portion, as another one of the second border information, into the second recording layer in a same radial position as that of the first end border information, after writing of each of the first and second user data, said second border controlling process controls said writing device to write buffer data or a jump prohibitive flag, as at least one portion of the first end border information, in order to prevent a writing position by said writing device from deviating to the other side through the first end border information from the end border of the first recording layer, said first border controlling process controls said writing device to write the first start border information after the writing of each of the first and second user data, and then to write or ensure the second end border information after the writing of the first start border information, and said second border controlling process controls said writing device to subsequently write the first end border information after the writing or the ensuring of the second end border information, and then to write or ensure the second start border information after the writing of the first end border information.

* * * * *